US012810734B2

(12) United States Patent
Chua et al.

(10) Patent No.: US 12,810,734 B2
(45) Date of Patent: Nov. 24, 2026

(54) PROCESS AND MACHINE TO MOVE RESOURCES

(71) Applicant: The Boeing Company, Arlington, VA (US)

(72) Inventors: Zarrin Chua, Seattle, WA (US); Alfredo Giuliano, Lucerne (CH); Francisco A. Navarro Félix, Lucerne (CH); Manuela Sauer, Lucerne (CH); Martin Kearney-Fischer, Boston, MA (US)

(73) Assignee: The Boeing Company, Arlington, VA (US)

( * ) Notice: Subject to any disclaimer, the term of this patent is extended or adjusted under 35 U.S.C. 154(b) by 197 days.

(21) Appl. No.: 18/782,404

(22) Filed: Jul. 24, 2024

(65) Prior Publication Data

US 2024/0379011 A1 Nov. 14, 2024

Related U.S. Application Data

(63) Continuation-in-part of application No. 17/647,495, filed on Jan. 10, 2022, now abandoned.

(51) Int. Cl.
*G08G 5/22* (2025.01)
*G06Q 50/43* (2024.01)

(52) U.S. Cl.
CPC ............... *G08G 5/22* (2025.01); *G06Q 50/43* (2024.01)

(58) Field of Classification Search
None
See application file for complete search history.

(56) References Cited

U.S. PATENT DOCUMENTS

| | | | | |
|---|---|---|---|---|
| 2014/0343833 | A1 | 11/2014 | Baiada et al. | |
| 2019/0221127 | A1* | 7/2019 | Shannon | G06Q 50/40 |
| 2019/0325757 | A1* | 10/2019 | Goel | G06Q 10/06315 |
| 2020/0193847 | A1 | 6/2020 | Shannon et al. | |
| 2020/0204375 | A1 | 6/2020 | Coulmeau et al. | |
| 2021/0374627 | A1* | 12/2021 | Mueller | G06N 7/01 |

OTHER PUBLICATIONS

Lowry, Michael R., "Towards High Density Urban Air Mobility," 2018, AIAA Aviation Forum, 2018 Aviation Technology, Integration, and Operations Conference, pp. 1-16 (Year: 2018).*
Bielli et al., "Trends in Models and Algorithms for Fleet Management," Procedia—Social and Behavioral Sciences, vol. 20, 2011, pp. 4-18.

(Continued)

*Primary Examiner* — Madison R. Inserra
(74) *Attorney, Agent, or Firm* — Yee & Associates, P.C.

(57) ABSTRACT

A process and machine configured to move resources. The process including: receiving petitions in a resource mover for a utilization, over a time period, by a vehicle of a number of resources; assigning by the resource mover a set of RUPs to each resource over the time period; determining, using a trigger, a mode of operation for the resource mover; deriving, accounting for factors affecting the resources, availability of RUPs, for each resource in the number of resources, over the time period; establishing a maxrety, respectively, allocating utilization of the RUPs for each resource in the number of resources over the time period; and controlling, according to the maxrety, utilizing the resources over the time period.

20 Claims, 13 Drawing Sheets

(56) References Cited

OTHER PUBLICATIONS

Espinoza et al., "Per-Seat, On-Demand Air Transportation Part II: Parallel Local Search," vol. 42, No. 3, Aug. 1, 2008, 25 pages.
Fagerholt et al., "A decision support model for establishing an air taxi service: a case study," J Oper Res Soc, vol. 60, No. 9, Jul. 9, 2008, pp. 1173-1182.
Final Office Action dated Apr. 24, 2024, regarding U.S. Appl. No. 17/647,495, 23 pages.
Kucharska, "Dynamic Vehicle Routing Problem—Predictive and Unexpected Customer Availability," Symmetry, vol. 11, No. 4, Apr. 15, 2019, Paper 546, 20 pages.
Maciejewski et al., "Towards a Testbed for Dynamic Vehicle Routing Algorithms," Communications in Computer and Information Science, vol. 722, May 28, 2017, 11 pages.
Office Action dated Feb. 27, 2024, regarding U.S. Appl. No. 17/647,495, 27 pages.
Pillac et al., "A review of dynamic vehicle routing problems," European Journal of Operational Research, vol. 225, No. 1, Feb. 16, 2013, 25 pages.
Psaraftis et al., "Dynamic vehicle routing problems: Three decades and counting," Networks, vol. 67, No. 1, Jan. 1, 2016, 49 pages.
Rajendran, Suchithra, "A Simulation-based Optimization Approach to Efficiently Route Air Taxis in a Cyber-Physical Network," Nov. 12, 2020, arXiv, pp. 1-48 (Year: 2020).
Vascik, Parker D. et al., "Development of Vertiport Capacity Envelopes and Analysis of Their Sensitivity to Topological and Operational Factors," Jan. 2019, American Institute of Aeronautics and Astronautics, AIAA SciTech 2019 Forum, pp. 1-26 (Year : 2019).
Wei, Qinshuang et al., "Capacity-Constrained Urban Air Mobility Scheduling," Jul. 2, 2021, arXiv, pp. 1-12 (Year: 2021).

* cited by examiner

PROCESS AND MACHINE TO MOVE RESOURCES

CROSS-REFERENCE TO RELATED APPLICATIONS

This application is a continuation-in-part of U.S. patent application Ser. No. 17/647,495, filed Jan. 10, 2022, and entitled "SLOT ALLOCATION OF VERTIPORT RESOURCES," which is incorporated herein by reference in its entirety.

BACKGROUND INFORMATION

Field

The present disclosure relates generally to movement of resources and in particular, to moving aircraft and other resources to, from, and at, a vertiport. An aircraft may be manned or unmanned.

Background

With increasing congestion of roadways in urban areas, other avenues of transportation such as mass transit have become more widely used. Rideshare has also increased in use. Rideshare allows a user to request a vehicle to take the user to a destination. This type of on-demand transportation reduces frustrations with driving in traffic but is still subject to commute times that are affected by the amount of road traffic congestion.

Another type of transportation involves passenger air vehicles (PAVs). Herein, a passenger air vehicle (PAV) refers to a type of aircraft that can be used to provide on-demand transportation in urban areas. A passenger air vehicle may seat and provide a comfortable and reliable ride for the passenger and can also be used to transport goods or other items.

A passenger air vehicle can be a piloted passenger air vehicle or may be an autonomous passenger air vehicle that provides for fully autonomous flight from takeoff to landing without needing a pilot. A passenger air vehicle may take the form of an electrical vertical takeoff and landing (eVTOL) aircraft for use in transporting passengers. An electric power system may provide cleaner and quieter transportation. Passenger air vehicles may be used for urban commutes. Without limitation, urban commutes may be 50 miles or more.

Herein, a flight of a passenger air vehicle from an origination location to a destination location may also be referred to as a mission. A vertiport may be located near an origination location. A vertiport may be located near a destination location. Herein, a vertiport may be a location at which the passenger air vehicle can take off and land using vertical takeoff and landing capabilities.

When operating unmanned passenger air vehicles in urban areas, an air traffic management system is expected to be provided to approve and control missions performed by passenger air vehicles. For example, a particular route for a passenger air vehicle can be approved through an air traffic management system. Additionally, a route or destination can be changed by the air traffic management system because of various events or environmental changes occurring during a flight of the passenger air vehicle.

Currently, selection of vertiports and routes by an air traffic management system is expected to take into consideration historical capacity of a vertiport to receive a certain number of landings per hour and/or launch a certain number of takeoffs per hour—also historically known as slots. Currently, aircraft operators schedule operations out of airports/vertiports based upon slots awarded to them by the air traffic management system, or by a vertiport resource mover allotted a given number of slots by the air traffic management system.

Currently, managing the operation of aircraft/passenger air vehicles can be more challenging and time-consuming than desired in providing services to transport passengers, cargo, or other items from an origination vertiport or to a destination vertiport. Currently, managing the operation of passenger air vehicles can be challenging and time-consuming to the point of precluding use of a full physical capacity existing to transport passengers, cargo, or other items from an origination vertiport or to a destination vertiport.

Current air traffic management systems in operation for airline passenger operations predict and allocate flight operations and capacity of aircraft in the air separately from capability metrics for operations on the ground at airports. Current air traffic management systems in operation for airline passenger operations lack comprehensive predictive or real-time integration of aircraft operations in the air with operations on the ground at airports a given aircraft is requesting to fly from or to when predicting system capacities and allocating flights between destinations.

Currently, air traffic management systems handle real-time overload of arrival capacity at commercial airports by restricting departures from airports destined to the commercial airport that is overloaded. Departure restrictions do not pre-analyze effects on the arrivals into or ground operations at the airports with the restricted departures. In other words, current departure restriction air traffic management adjustments to operational capacity overloads at airports do not provide an effective anticipation and/or mitigation of the impact of departure disruptions on future missions.

SUMMARY

An embodiment of the present disclosure provides a process for moving resources. The process may include: receiving petitions in a resource mover for a utilization, over a time period, by a vehicle of a number of resources; assigning, by the resource mover, a set of RUPs to each resource over the time period; determining, using a trigger, a mode of operation for the resource mover; deriving, accounting for factors affecting the resources, availability of RUPs within the set of RUPs, for each resource in the number of resources, over the time period; establishing a maxrety, respectively, allocating utilization of available RUPs within the set of RUPs for each resource in the number of resources over the time period; and controlling, according to the maxrety, utilizing the resources over the time period. The mode of operation may be either a pre-execution mode or an execution mode. The trigger may be activated by an ultradynamic state of any source in a resource movement system or by a premonition. The factors affecting the resources may include a noise regulation, a passenger load, an operator qualification, a flight attendant availability, a gate agent availability, a ground servicing crew qualification, a taxi duration, a boarding duration, a deboarding time, a gate occupancy time, a number and/or location of LoLAs for departures, a number and/or location of LoLAs for arrivals, a potential conflict check time, a number of vehicles, or a number and location of non-gate parking spots.

Without limitation, each RUP in the set of RUPs may have a 30 second duration. The set of RUPs may include arrival RUPs, departure RUPs, and service RUPs. The process for moving resources may also include deriving, using a RUP for a LoLA and a RUP for a gate: the arrival RUPs, the departure RUPs, and the service RUPs. The process for moving resources may also include the resource mover responding to an unexpected event by reallocating at least one of: an arrival RUP, a departure RUP, or a service RUP. The process for moving resources may also include the resource mover reallocating at least one of: an arrival RUP, a departure RUP, or a service RUP, in execution mode.

Another embodiment of the present disclosure provides a machine that includes a computer system that includes a resource mover configured to: receive petitions for a utilization, over a time period, by a vehicle of a number of resources; assign a set of RUPs to each resource over the time period; determine, based upon a trigger, a mode of operation for the resource mover; derive, based upon factors that affect the resources, an availability of RUPs within the set of RUPs, for each resource in the number of resources, over the time period; establish a maxrety, respectively, that allocates utilization of available RUPs within the set of RUPs for each resource in the number of resources over the time period; and control, based upon the maxrety, utilization of the resources over the time period.

The mode of operation may be either a pre-execution mode or an execution mode. The trigger may be based upon an ultradynamic state of any source in a resource movement system or a premonition. The factors may include a noise regulation.

The resource mover may be further configured to form: arrival RUPs, departure RUPs, and service RUPs. The arrival RUPs, the departure RUPs, and the service RUPs, may be based upon a RUP for a LoLA and a RUP for a gate.

Another embodiment of the present disclosure provides a process for moving resources at a vertiport, the process including: receiving petitions in a vertiport resource mover for a utilization, over a time period, by a vehicle of a number of resources; assigning by the vertiport resource mover a set of RUPs to each resource over the time period; determining, using a trigger based upon a premonition or an ultradynamic state of a source to the vertiport resource mover, a mode of operation for the vertiport resource mover; deriving, accounting for factors affecting the resources, availability of RUPs within the set of RUPs, for each resource in the number of resources, over the time period; establishing a maxrety, respectively, allocating utilization of available RUPs within the set of RUPs for each resource in the number of resources over the time period and for; and arrival RUP, a departure RUP, and a service RUP; and controlling, according to the maxrety, utilizing the resources at, arriving, and departing the vertiport over the time period.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

DETAILED DESCRIPTION

Figure 1:
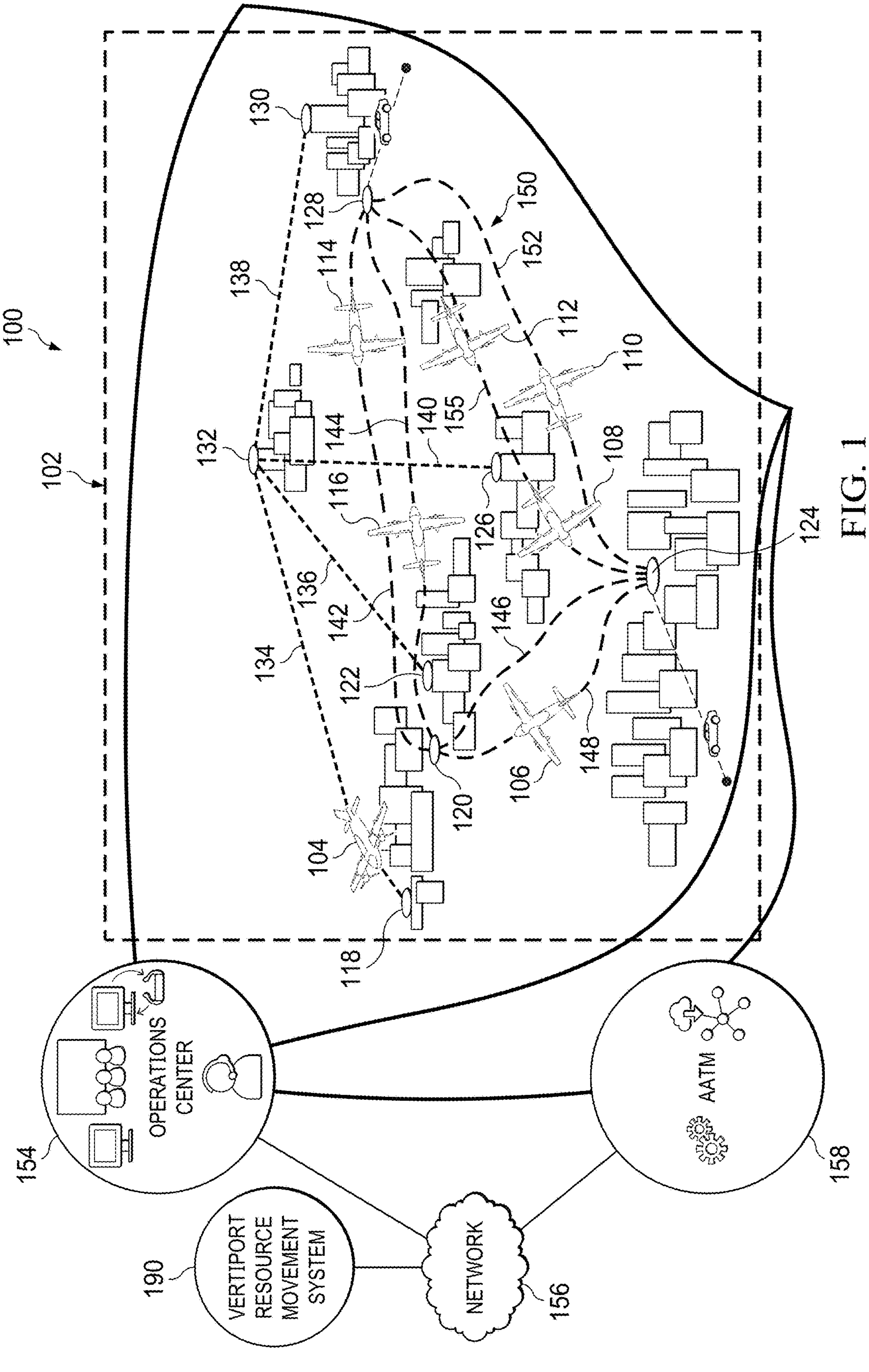
FIG. 1 is a pictorial illustration of an air vehicle resource movement environment in accordance with an illustrative example.

The illustrative examples recognize and take into account one or more different considerations. For example, the illustrative examples recognize and take into account that current strategic planning of departure slots is performed for airports in a network to attempt to produce a balance between maximum resource availability and demand in air transportation operations.

The illustrative examples recognize and take into account that the business model/benefit for passenger air travel over ground transportation is that passenger air travel may offer a customer a time savings of roughly 30-60 minutes compared to ground transportation (i.e. flight to drive time ratio of roughly 10-50%). The nature of the missions for passenger air vehicles, namely short flights of roughly 10-30 minutes makes such operations sensitive to any form of delay. This sensitivity to any delay is in contrast to traditional air transport systems which typically save customers many hours to days or weeks compared to ground transportation options (flight to drive time ratio of much less than 10%). Hence, any unanticipated delay can rapidly erode the value proposition for the passenger air vehicle customer predominately booking for a travel time of 30 minutes or less.

The illustrative examples recognize and take into account that network simulations or statistical models can be utilized to forecast the flow of arriving traffic at airports in the network over time. The illustrative examples recognize and take into account that this forecasting allows determining whether the flow exceeds a capacity declared by an airport and/or assigned by an air traffic management system. The illustrative examples recognize and take into account that historically when saturation situations occur in a forecast for a route and/or a given airport, scheduled departure times of operations have been modified to reduce a flow of traffic arriving onto a route and/or the given airport, preventing a saturation situation. The illustrative examples also recognize and take into account that airport capacity can be monitored real time and that traditionally it has been departure slots that air traffic management has altered from a preplanned/scheduled flow when congestion or capacity reduction occurs dynamically, which can result in departure delays.

The illustrative examples recognize and take into account that the current techniques for balancing capacity and demand at airports modifies departure slots for departure in strategic timeframes such as mission planning. The illustrative examples recognize and take into account that the tracking/directing/controlling of arrival times, taxi movements, gate allocations, crew assignment, and ground equipment is deferred to other agencies in strategic timeframes such as mission planning. The illustrative examples recognize and take into account that the tracking/directing/controlling of arrival times, taxi movements, gate allocations, crew assignments, and or ground equipment allocation is deferred to other agencies in tactical timeframes such as during mission execution. The illustrative examples recognize and take into account that the current techniques for balancing capacity and demand at airports generally set a static plan at least a month ahead of operations. For various reasons, some of which may include regulations, little to no reallocation of resources is executed or may even be prohibited on a daily or shorter timeframe. Currently, capacity predictions and planning are based upon a predictive static time scale separated from real-time operations and execution of missions.

Currently, daily operations respond to delay events in a principally reactionary and federated manner that results in misalignment of resource availability/utilization. One non-limiting example may be when a mission for which the aircraft and passenger assignment impacts/requirements have been addressed, but the crew impacts were not addressed. Daily operations may require air passenger vehicle operations to apply tactical tools on a time scale separate and largely decoupled from the initial static predictive capacity planned schedules. Currently, fleet operators resort to separate schedule disruption recovery tools and/or procedures, to help regain a pre-planned static/nominal flow of operations. The recovery tools frequently involve flight cancelations and/or large delays. Currently, these mechanisms have little ability to mitigate the consequences of these cancelations or delays because of the independent planning processes applied to the different resources.

The illustrative examples recognize and take into account that to date, extension of slot management strategies to become customized for specific arrival Resource Utilization Periods (RUPs) or gate RUPs is not performed in strategic managing of air traffic. As used herein, a Resource Utilization Period (RUP) is defined as a period of time that a resource and/or a location is being utilized. A RUP may be defined by a start and a stop time that establishes the period. At least because of a low fidelity in the predicting of aircraft trajectories for current airport operations at airports and lack of integrated consideration for ground movement or servicing resource utilizations, planning and execution of resource movements and/or utilization based upon RUPs instead of traditional airport capacity analysis provides many benefits that improve an efficiency in utilization of the resources.

The illustrative examples recognize and take into account that these types of management techniques used with traditional airports do not apply well to traffic by aircraft/passenger air vehicles using vertiports. The illustrative examples also recognize and take into account that with vertical takeoff and landing (VTOL) aircraft relatively short routes may predominate, higher pace operations are common, and higher traffic densities may be present as compared to traditional airports.

The illustrative examples recognize and take into account that the marketplace tools present in the use of air services has evolved to where even petitions/requests for service from users may be generated in a tactical timeframe, well after initial static planning has been completed. Hence, load factors and desired routes and utilization for available resources may not be the same in the afternoon as they may have been at the start of a business day.

Causes of such dynamic changes may not be historically based. Causes of such dynamic changes may not be predictable, nevertheless, operators must be able to respond to changes in demands to optimize efficient use of resources and profitability. Hence while capacity may be a term/concept that remains for strategic planning, there must be an understanding that capacity for resource utilization may also have a dynamic meaning that may be qualified by increasingly smaller time segments and expanded to apply to a greater number of resources simultaneously and/or cooperatively beyond just a number of aircraft departures per hour. In other words, a need exists to couple ops planning and real-time execution by available resources instead of their traditional decoupled functions.

The illustrative examples recognize and take into account that incoming and outgoing flows of air traffic at a vertiport ought to be continuously balanced over time so that a vertiport may continue operating at near maximum resource utilization for all operational time periods. A vertiport ought to be able to function with very limited or no need to accumulate idle aircraft depending on the number of parking areas, which may also be referred to as gates. The illustrative examples recognize and take into account that the maximum resource utilization of a vertiport can be characterized by a customized optimum maximum number of landing, turnaround, and takeoff operations that can be performed per hour with a desired level of conflict free operation at the vertiport. The illustrative examples recognize and take into account that this maximum resource utilization may be determined based at least on the number of Launch or Land Area (LoLA) areas and gates available.

Hence, to provide for high volume, and/or short duration, and/or rapid turnaround air vehicle operations at a vertiport, a need exists to pursue a transportation paradigm where the demand can be characterized as follows:

- Dynamic=unpredicted (not yet characterized historically/statistically) incoming need/petition for a movement and/or utilization of resources (likely originating in a time period during or prior to execution of a mission that may be a fraction of the timescale used for strategic/static pre-planned operations)
- Petitions may specify both an origin (departure) vertiport (DVP) and a destination (arrival) vertiport (AVP)
- Petitions may specify a specific resource and/or a specific time objective (TO), such as without limitation ASAP (As Soon As Possible) or an ETA (Estimated Time of Arrival) or that may include a start or stop time and/or duration.
- Petitions may specify a cost objective (CO), which may be without limitation a choice out of a simple set of options, e.g. cheapest (CHPST), standard (STD) and premium (PRM). For instance, cheapest CO may allow considering vehicle sharing by different petitioners, as well as intermediate stops while premium CO might imply higher fees to the fleet operator in order to gain priority access to airspace and/or vertiport resources.
- Petitions may specify characteristics of a payload (PL), i.e. number of passengers and an estimate of the luggage they carry. In other words, there is a need for a new machine and process that will no longer decouple flight operations capacity prediction, tracking, direction, control, and planning from real-time control and execution of the flights and of all resources associated with the flights that may affect their operation. In other words, a machine and process for schedule recovery should no longer be separate and/or independent from a machine and process for capacity and schedule planning. Nor should the machine and process for planning or schedule recovery of any one resource needed for a mission be handled independently of any other resource also needed for that same mission. Hence, the illustrative examples recognize and take into account the need to robustly plan UAM missions of an entire fleet in a highly dynamic environment where demand may come randomly, missions often require re-planning prior to as well as during execution, and the airspace and vertiport resources be directed/controlled by third-parties (without limitation, Unmanned Traffic Management and/or Vertiport Operators) and competed by other airspace users.

Thus, the illustrative examples provide a method, apparatus, system, and computer program product for moving resources on a vertiport at maximum resource utilization without conflicts. These vertiport resources may include without limitation arrival RUPs (Resource Utilization Periods) and departure RUPs for Launch or Land Area (LoLA) areas.

As used herein, without limitation a LoLA may be a surface such as a vertipad, a runway, a rooftop, a parking spot, or any surface adequate for use to launch and/or land a vehicle/aircraft such as without limitation passenger air vehicle as described below. As used herein, without limitation the term launch may mean lift off from and land may mean to alight upon. As nonlimiting examples, an aircraft taking off from a runway, or a passenger air vehicle rising away from a vertipad may be considered launches.

These RUPs can be used to determine the sequence of available scheduled landing times (SLDTs) and scheduled takeoff times (STOTs). These times can be used in mission planning for flights that use Launch or Land Area (LoLA) areas at vertiports.

Additionally, service RUPs can be used for resources used for surface operations. The service RUPs can be for resources selected from without limitation at least one of: a parking area and/or a gate, a taxiway, a designated maintenance area and/or hanger, or other suitable resources. Without limitation, LoLAs may also be service RUPs when a gate or other separate parking area is not present at the vertiport. In other words, a LoLA can also function as a parking/service area.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

With reference now to the figures and, in particular, with reference to FIG. 1, a pictorial illustration of an air vehicle resource movement environment is depicted in accordance with an illustrative example. As depicted, air vehicle resource movement environment 100 is an environment in which autonomous air vehicles, which may be in the form of passenger air vehicles (PAVs), may be allocated, directed, and/or controlled to move at least one of passengers, goods, cargo, or other objects from an origination location to destination locations in urban area 102. In this illustrative example, urban area 102 can include at least one of a city, a town, a suburb, a metropolitan area, or some other area that includes or encompasses one or more populated areas.

As depicted, passenger air vehicles servicing urban area 102 comprise passenger air vehicle 104, passenger air vehicle 106, passenger air vehicle 108, passenger air vehicle 110, passenger air vehicle 112, passenger air vehicle 114, and passenger air vehicle 116. In this illustrative example, the passenger air vehicles can be electrical vertical takeoff and landing (eVTOL) aircraft or air taxis. These types of vehicles can provide on-demand transportation in a manner that reduces (e.g., minimizes) commutes for passengers that may be caused by road congestion and urbanization of populated areas. These passenger air vehicles can operate to provide on-demand aviation services to move the passengers from one location to another location. Hence, any reference to an aircraft herein may include a passenger air vehicle such as without limitation passenger air vehicle 104.

In this illustrative example, the passenger air vehicles can fly along routes between different vertiports. In this illustrative example, vertiports are on locations with structures for aircraft to land and take off vertically. As depicted, the vertiports include vertiport 118, vertiport 120, vertiport 122, vertiport 124, vertiport 126, vertiport 128, vertiport 130, and vertiport 132.

The vertiports in this example can be located in many different locations such as a ground location, on top of a building, or in some other suitable location that is desirable for commuting or transportation of objects. For example, vertiport 118, vertiport 122, vertiport 126, vertiport 130, and vertiport 132 are located on buildings while vertiport 120, vertiport 124, and vertiport 128 are located at ground locations.

As depicted, the passenger air vehicles can fly on the different routes to move passengers, cargo, or both between the vertiports within urban area 102. In this illustrative example, these routes include route 134, route 136, route 138, and route 140, which are routes between buildings. The routes also include routes between ground locations. These routes include route 142, route 144, route 146, route 148, route 150, route 152, and route 155.

As depicted, the operation of the passenger air vehicles can be controlled by operations center 154. In this illustrative example, operations center 154 includes computers, communications equipment, navigation equipment, air traffic surveillance equipment, networks, and other suitable hardware that may operate to may allocate, track, direct, and/or control missions for passenger air vehicles in urban area 102. Operations center 154 can be in a single location or can be distributed through multiple locations in which the different computers at those locations are connected to each other by network 156.

In this illustrative example, operations center 154 can perform various operations selected from at least one of mission planning and optimization, mission validation, route authorization, mission monitoring, or other suitable functions. For example, operations center 154 can receive requests for use of the passenger air vehicles from passengers. In processing these requests, operations center 154 can plan missions to transport from passengers between vertiports. In this illustrative example, the vertiports are in communication with operations center 154. These vertiports can be in direct communication with operations center 154 or can communicate with operations center 154 through automated aircraft traffic management 158.

In this depicted example, network 156 represents a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. In other illustrative examples, network 156 can be implemented using a number of different types of networks. For example, network 156 can be comprised of at least one of the Internet, an intranet, a local area network (LAN), a metropolitan area network (MAN), or a wide area network (WAN).

As used herein, a "number of," when used with reference to items, means one or more items. For example, a "number of different types of networks" is one or more different types of networks.

As part of mission planning, operations center 154 can request authorization to fly missions along various routes. These requests can be sent to automated aircraft traffic management (AATM) system 158 via network 156. In this illustrative example, automated aircraft system traffic management 158 is a traffic management system for uncontrolled operations of passenger air vehicles that are separate from and complementary to the legacy air traffic management (ATM) system for the Federal Aviation Authority (FAA).

Further, operations center 154 can also communicate with at least one of the passenger air vehicles or vertiports. These components are also connected to network 156. For example, the passenger air vehicles can be connected to network 156 using wireless connections. In this manner, the passenger air vehicles can communicate with each other, vertiports, operations center 154, or some combination thereof. As another example, the passenger air vehicles can communicate with each other directly using vehicle to vehicle (V2V) communications while using frequency ranges such as 5.855 GHz to 5.905 GHZ and 5.770 GHz to 5.850 GHz or other frequency ranges that may be made available.

Illustration of air vehicle resource movement environment 100 in FIG. 1 is provided as an example of one implementation for this type of environment and is not meant to limit the manner in which air vehicle resource movement environment 100 can be implemented in other illustrative examples. For example, in other illustrative examples, routes may be present between ground locations and buildings. In another illustrative example, the passenger air vehicles may include air vehicles with combustion propulsion systems in addition to or in place of using electric propulsion systems. In yet another illustrative example, one or more routes can connect urban area 102 to one or more urban areas in air vehicle resource movement environment 100. In yet another example, operations center 154 may allocate, track, direct, and/or control missions for other urban areas in addition to or in place of urban area 102. In other illustrative examples, any type of air traffic management system can be used in addition to or in place of automated aircraft system traffic management 158. As another example, other types of air vehicles or aircraft in addition to or in place of passenger air vehicles can be managed within air vehicle resource movement environment 100.

As depicted, vertiport resource movement system 190 is connected to network 156. This connection enables vertiport resource movement system 190 to communicate with at least one of vertiport 118, vertiport 120, vertiport 122, vertiport 124, vertiport 126, vertiport 128, vertiport 130, or vertiport 132.

In this illustrative example, vertiport resource movement system 190 may operate to allocate, track, direct, and/or control vertiport resources at one or more of these vertiports. For example, vertiport resource movement system 190 may allocate, track, direct, and/or control vertiport resources such as without limitation a Launch or Land Area (LoLA) area, a gate, or other suitable resources.

Vertiport resource movement system 190 may allocate, track, direct, and/or control these resources using time allocation, tracking, direction, and/or control processes for increasing the usage of these resources. For example, vertiport resource movement system 190 may allocate, track, direct, and/or control the allocation of at least one of arrival RUPs or departure RUPs in a manner that increases the desired usage of vertiport resources. Further, vertiport resource movement system 190 can provide a centralized solution for allocating, tracking, directing, and/or controlling vertiport resources in multiple vertiports. As a result, vertiports allocated, tracked, directed, and/or controlled by vertiport resource movement system 190 can operate with a desired level of conflict free operation at higher capacities in which dynamic demand occurs as compared to current techniques of the vertiport resource management.

Figure 2:
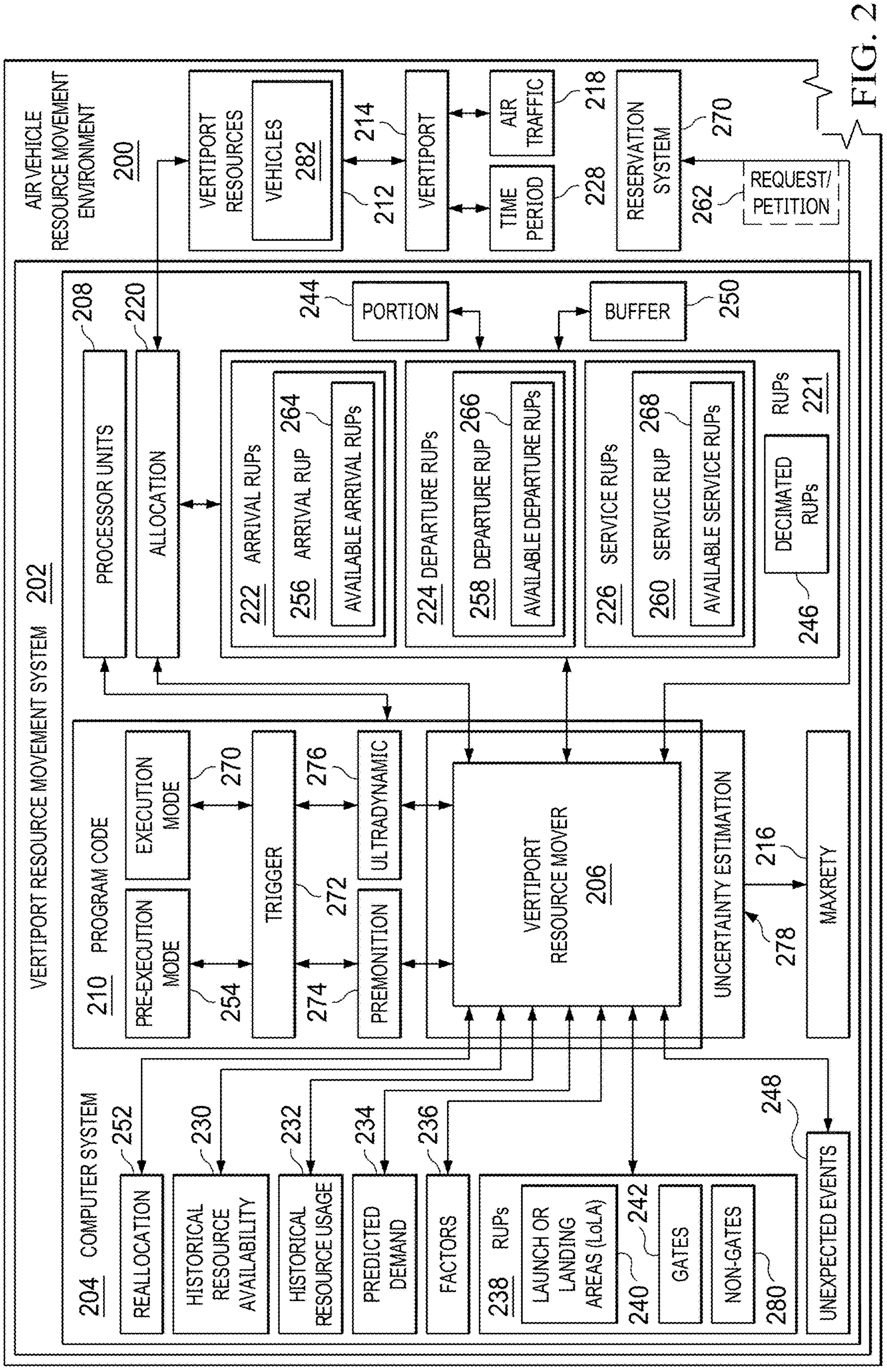
FIG. 2 is an illustration of a block diagram of an air vehicle resource movement environment in accordance with an illustrative example.

Turning next to FIG. 2, an illustration of a block diagram of an air vehicle resource movement environment is depicted in accordance with an illustrative example. Air vehicle resource movement environment 100 is an example of one implementation for air vehicle resource movement environment 200 shown in block form in FIG. 2.

In this illustrative example, vertiport resource movement system 202 in air vehicle resource movement environment 200 may operate to allocate, track, direct, and/or control vertiport resources 212. Vertiport resource movement system 202 comprises a number of different components. As depicted, vertiport resource movement system 202 may be considered a machine that comprises computer system 204 and vertiport resource mover 206.

Owner/operator of vertiport resource movement system 202 may also be owner and/or and negotiate contracts with controller/owner of any third-party resources at vertiport 214. Accordingly, without limitation an air carrier could also apply vertiport resource movement system 202 to allocate, track, direct, and/or control their flight operations. Multiple agents within air vehicle resource movement environment 200 or an interfacing environment and/or system could be using this process simultaneously (e.g., both the Air Carrier and the Vertiports in a region using this process to plan and execute their operations).

Vertiport resource mover 206 can be implemented in software, hardware, firmware or a combination thereof. When software is used, the operations performed by vertiport resource mover 206 can be implemented in program code configured to run on hardware, such as a processor unit. When firmware is used, the operations performed by vertiport resource mover 206 can be implemented in program code and data and stored in persistent memory to run on a processor unit. When hardware is employed, the hardware can include circuits that operate to perform the operations in vertiport resource mover 206.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, computer system 204 includes a number of processor units 208 that are capable of executing program code 210 implementing processes in the illustrative examples. As used herein, a processor unit in the number of processor units 208 is a hardware device and is comprised of hardware circuits such as those on an integrated circuit that respond and process instructions and program code that operate a computer.

When a number of processor units 208 execute program code 210 for a process, the number of processor units 208 is one or more processor units that can be on the same computer or on different computers. In other words, the process can be distributed between processor units on the same or different computers in a computer system. Further, the number of processor units 208 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, vertiport resource mover 206 may allocate, track, direct, and/or control vertiport resources 212 at vertiport 214. Vertiport resources 212 are resources used to handle air traffic 218 using vertiport 214. Vertiport resources 212 can be, for example without limitation, a gate, a Launch or Land Area (LoLA) area, a hanger, a service area, or other suitable resource. In this illustrative example, air traffic 218 comprises vertical takeoff and landing (VTOL) aircraft. This type of aircraft can include, for example, helicopters, aircraft, cycle copters, and fixed wing aircraft. These aircraft can be electric or hybrid electric vertical takeoff and landing aircraft.

Vertiport resource mover 206 can operate to determine maxrety 216 for handling air traffic 218 at vertiport 214. In this example, maxrety 216 is a novel word for the customized maximum resource availability value produced by a novel machine and process described herein for a vertiport 214 to handle air traffic 218. Vertiport resource mover 206 may allocate, track, direct, and/or control allocation 220 of Resource Utilization Periods (RUPs) 221 to handle air traffic 218. Though related to the current air traffic management term and concept of capacity, maxrety 216 may describe a number of allowed departures and/or arrivals at a vertiport for a designated time period that are distinct from the process and value used currently by air traffic management to establish what is termed currently a "capacity" of an airport. Maxrety 216 may derive and present a format for maximum resource availability that specifies details for types or resources and specific durations for each resource use/movement within the designated time period. Without limitation, as opposed to a capacity of 30 departures per hour, maxrety 216 may be derived and presented as: 20 departures per hour for type A vehicle, 25 for type B vehicle, and 7 for type C vehicle. Without limitation, maxrety 216 may be derived and presented as: 7 departures per hour from launch and land area D, 16 departures per hour from launch and land area E, and 14 departures per hour from launch and land area F. Without limitation, maxrety 216 may be derived and presented as: exact allocated utilization periods defined by start and stop times for each resource associated with a mission. Without limitation, maxrety 216 may be derived and presented as: charted precise utilization of each individual resource for each moment in time across the designated time period. As further detailed herein, one of ordinary skill in the art recognizes that since each utilization of each resource is fully tracked throughout the designated time period, that the iterative fully integrated resolution of converging constraints for utilization of each resource executed by the special algorithms of vertiport resource mover 206 produces maxrety 216 that precludes the current problems scheduling and availability of resources for a mission are disconnected and at times in conflict.

A Resource Utilization Period (RUP) in RUPs 221 is a period of time of available use of a resource. A RUP is not equivalent to the traditional term of slot that indicated an allowed takeoff or departure of a single aircraft from an airport within some time period, (i.e. one departure from O'Hare between 10-11 am). Unlike air traffic management assigned slots to date, RUPs 221 describe an allocated utilization of an individual discrete resource for a specific period of time. So instead of telling an airline, "Flight123 will get to use one of the runways to takeoff somewhere between 2-3 pm", the contracting mechanism of a novel vertiport resource movement system described herein takes the form "Flight123 will get to use runway A to takeoff between 3:05-3:07". And instead of managing the reservation of different types of resources independently, a novel vertiport resource movement system described herein provides a machine and a process that move/control all of the resource allocations needed to conduct an operation. The combination of the two attributes (specific resource reservation and holistic reservation) creates a significant improvement in the ability to control and/or maximize operational efficiency for each resource and for the operation as a whole. In other words, a novel vertiport resource movement system described herein provides a machine and a process that redefine the term and concept of capacity for a vertiport/airport operating with an air traffic management system.

With the novel machine and process embodiments described herein, capacity no longer is assigned to an airport by a historically derived single number of departures/arrivals per hour disconnected from a type of aircraft or mission associated with those departures/arrivals and the all the resources needed to support those departures/arrivals meeting assigned schedules. Capacity is now derived in terms of total departures/arrivals allowed utilizing detailed LoLA RUPS available allocated in planning or occupied during execution of missions. Hence, at a strategic level, the planning does not begin with a set number of departures per hour that are bid for and allocated to particular airlines/operators. In contrast, RUP requirements per resource per mission may be submitted with a request for approval, and vertiport resource movement system is able to run customized convergence resource optimization algorithms that optimize allocation of total resources to maximize RUP utilization for each LoLA over any designated time period.

Hence, in deriving maxrety 216 the vertiport resource movement system 190 is able to recognize that resource utilization may allow for 50 departures per hour using one type of aircraft with one type of payload on one type of mission versus perhaps only 15 operations per hour for a different type of aircraft with a different type of payload on a different type of mission. Hence, using a current air traffic management planning mode of setting airport capacity at 30 departure slots per hour based upon historic data would result in likely underutilization or backlogging of aircraft arrivals and departures for a given airport—as is commonly experienced by passengers today. The holistic planning for integrated utilization of all resources used in the development of maxrety 216 ensures that a disruption to any resource required for the mission can be detected and mitigated. Hence, vertiport resource mover 206 provides a machine and process that provide a technical advantage over a current air traffic management planning mode of federated resource planning that often results in backlogging of aircraft arrivals and departures due to misalignment of needed resources.

When a resource includes a manned component, the terms move or control by the vertiport resource movement system indicate vertiport resource movement system 202 deriving and/or issuing authorization to move and/or utilize a resource in either a strategic plan or in real-time during execution of a mission. For a resource under automated control, move/control may include actually directing/initiating and/or providing the authorization that directs/initiates the physical movement and/or utilization of the resource.

Currently, airport owners assign rights to operate out of a gate or gates to particular airlines for contractual periods of time independently from departure/arrival slots awarded by air traffic management services. During operations, this independent allocation of resources contributes to inefficient operations whereby landing aircraft have no gates available to unload their cargo and/or passengers or to refuel/recharge during their ground time-perhaps even while another aircraft on another gate is fully loaded, but cannot depart the gate because the crew assigned to fly the loaded flight is still on the aircraft that is waiting to park at a gate.

For the embodiments herein, each resource is associated with a set of RUPs over some designated period of operations, such as without limitation each 24 hours. Each RUP is defined for each resource by a start and an end time that define the duration of the RUP. For a single resource, such as a particular LoLA, the LoLA may possibly be assigned, without limitation, a set of RUPs divided into every 30 second period of a 24 hour day. The duration of RUPs 221 can be heterogeneous in length. In other words, different RUPs in RUPs 221 can have different durations. Thus, any given takeoff for any particular aircraft may be assigned a LoLA RUP or a set of LoLA RUPS that extends for a period of time within that 24 hour day that is specific in duration (defined by a start and a stop time) for that specific aircraft on a specific day (or flight of that day when the aircraft flies to/from a given airport more than once in a day).

In this illustrative example, vertiport resource mover 206 may allocate, track, direct, and/or control allocation 220 of arrival RUPs 222 and departure RUPs 224 in RUPs 221 for air traffic 218 using vertiport 214 based on maxrety 216 determined for vertiport 214. In this illustrative example, vertiport resource mover 206 establishes new criterion for the meaning and derivation of maxrety 216 for a vertiport in place of a traditional capacity for an airport. Because of the novel full integration of scheduling all resources associated with completion of a mission by a machine and process described herein, the utilization of resources at a vertiport is no longer limited to the current air traffic management definition of a capacity number of departures per hour.

Additionally, vertiport resource mover 206 may allocate, track, direct, and/or control allocation 220 of service RUPs 226 in RUPs 221.

In the illustrative example, different arrival RUPs in arrival RUPs 222 can have different durations. In a similar fashion, different departure RUPs in departure RUPs 224 can have different durations, and different service RUPs in service RUPs 226 can also have different durations. In some illustrative examples, the durations can be the same for the different types of RUPs 221.

Significantly, Vertiport Resource movement system 202 is programmed to function in two parallel modes. The parallel modes are planning mode 254 and execution mode 270. In planning mode 254 resource utilization and environmental influences on resource utilization are planned/programmed to derive maxrety 216 primarily on historical data for the resource and environmental influences. Planning mode 254 will also establish benchmark average values for data received for all resource and/or environmental influence or factor 236 as inputs to Vertiport Resource movement system 202. In other words, planning mode 254 may be considered a "long" range/strategic mode that is akin to, but far more accurate and comprehensive than today's air traffic management assigned capacity based slot allocation.

Environmental influences may include anything not directly controlled by the aircraft/airport/air traffic management owners/operators. Environmental influences may include without limitation weather. Weather may include without limitation atmospheric conditions such as without limitation temperature, humidity, and/or air pressure. As a nonlimiting example, an environmental influence may also be a social gathering, such as without limitation a concert or sporting event.

In execution mode 270, Vertiport Resource movement system 202 is programmed to derive maxrety 216 primarily from real-time data sensed by sensors on any resource or environmental influence. In execution mode 270, Vertiport Resource movement system 202 is programmed to derive maxrety 216 if real-time data is not available by using most current data or a near term forecast for any resource or environmental influence. In other words, execution mode 270 may be considered an agile real-time tactical mode that is responsive to dynamic needs and changes while considering all resources and factors in a comprehensive manner that delivers a maximization of resource utilization that does not exist today.

Trigger 272 may switch operational mode of vertiport resource movement system 202 for a resource from planning mode 254 to execution mode 270. When a start time of a mission is within premonition 274 of the current time, trigger 272 will switch operational mode of vertiport resource movement system 202 for a resource from planning mode 254 to execution mode 270. Premonition 274 is defined herein to be a designated amount of time. As a nonlimiting example, premonition 274 may be designated at 8 hours.

Trigger 272 may also be directed to switch operational mode of vertiport resource movement system 202 for a resource from planning mode 254 to execution mode 270 when estimates for any designated source data used by vertiport resource movement system 202 become ultradynamic 276. Ultradynamic 276 is defined herein as a state occurring when any values for any uncertainty estimation 278 for any source data received as a part of vertiport resource movement system 202 determinations for maxrety 216 fall below averaged levels benchmarked in planning mode 254. As a nonlimiting example using a single parameter: if winds aloft along route ABC are modeled in planning mode 254 as having a benchmark average range of 60 knots (−30 to +30), when uncertainty estimation 278 for winds during estimated execution time of mission 123 has a range less than 60 kts (perhaps wind range prediction is 20 kts (+/−10 kts) then vertiport resource movement system 202 resource utilization processing switches into execution mode 270. Uncertainty estimation 278 may be provided by source of input to vertiport resource mover 206 and/or may be determined by vertiport resource mover 206 for input received.

In the illustrative example, the different RUPs 222 are periods of time during which various types of resources are being utilized with respect to air traffic 218 at vertiport 214. For example, unless a single resource may be utilized/occupied by more than one user at the same time, no RUPs 222 for a given resource may overlap. Departure RUPs 224 are periods of time during which departure operations for air traffic 218 can occur and thus may be formed from a series of RUPs for various resources. Without limitation, a departure RUP will include an aircraft RUP for a period of time that may be coincident with a consecutive collection of: without limitation, a RUP of a particular gate, a RUP of a particular taxiway, and a RUP of a particular LoLA. A RUP for a particular tow vehicle may coincide with a RUP for a particular taxiway and a RUP for the particular gate.

Service RUPs 226 are time periods during which operations may be executed to service an aircraft. For example, a service RUP may be for a gate or for some other location. Without limitation, a service RUP may be for a Launch or Land Area (LoLA) area. A LoLA area can be used when a gate is unavailable.

In determining maxrety 216 for handling air traffic 218 at vertiport 214, vertiport resource mover 206 can determine maxrety 216 for handling air traffic 218 at vertiport 214 during time period 228 based on at least one of historical resource availability 230 at vertiport 214, historical resource usage 232 at vertiport 214, or a predicted demand 234 for vertiport resources 212 for vertiport 214.

Time period 228 can be any period of time for which maxrety 216 is to be determined. For example, time period 228 can be, for example, 5 minutes, an hour, 11 hours, a day, a week, or some other period of time for which it is desirable to know maxrety 216. Time period 228 can start from a current time or some future time. Time period 228 may be selected and used to provide a resource utilization plan that overcomes the current problems that result at airports from the current air traffic management approach to deriving and/or managing air traffic route and airport capacity. Time period 228 may incorporate a part of a RUP or a collection of RUPs 221. Time period 228 may be applied to evaluations for individual, sets, and/or for all resources.

Further, in determining maxrety 216 for handling air traffic 218 at vertiport 214, vertiport resource mover 206 can take into account factors 236 for at least: arrival RUPs 222, departure RUPs 224, and service RUPs 226. In this illustrative example, factors 236 can be selected from at least one of: a passenger load, a pilot/operator availability/qualification, a flight attendant availability/qualification, a gate agent availability/qualification, a ground servicing crew availability/qualification, a taxiing time, a boarding time, a disembarkation time, a gate occupancy time, a gate location, a number and/or location of LoLAs for departures, a number and/or location of LoLAs for arrivals, a preflight preparation time, a battery charging time, a potential conflict check time, a turnaround time, required maintenance, turnaround equipment, a number of vehicles/aircraft (282) such as without limitation passenger air vehicles, a type of vehicle/characteristics of a particular aircraft/vehicle, an operational status of a vehicle/aircraft and/or other resource, an inspection/maintenance requirement of a vehicle/aircraft and/or other resource, a number of LoLAs at the vertiport, a route between vertiports, a departure procedure, an arrival procedure, a number of gates at the vertiport, a number and location of non-gate parking spots (280), fueling/charging equipment and/or manpower, a number of aircraft expected in a day, a noise regulation, weather/atmospheric conditions/winds, a charging and/or refueling time, and/or some other factor that can affect the use of the different types of RUPs. Hence, vertiport resource movement system 202 provides the technological improvement of integrating resource allocation/tracking/direction/control and coordinates/optimizes interfacing among scheduling machines and processes and agencies that currently operate separately for at least, without limitation: aircraft scheduling, aircraft routing, flight crew scheduling, passenger service scheduling, ground crew scheduling, ground service equipment scheduling, ramp operations scheduling, air traffic management, airport ground control, airport approach control, airport departure control, and airport tower control.

As another example, in determining maxrety 216 for handling air traffic 218 at vertiport 214, vertiport resource mover 206 can determine RUPs 238 for a set of Launch or Land Area (LoLA) areas 240 and a set of gates 242 at vertiport 214.

As used herein, a "set of" when used with reference items means one or more items. For example, a set of LoLAs 240 is one or more LoLAs.

In determining maxrety 216 in this example, vertiport resource mover 206 determines arrival RUPs 222, departure RUPs 224, and service RUPs 226 available for use based on RUPs 238 determined for the set of LoLAs 240 and the set of gates 242 at vertiport 214 to form maxrety 216 for handling air traffic 218 at the vertiport 214. In determining arrival RUPs 222, departure RUPs 224, and service RUPs 226, vertiport resource mover 206 determines arrival RUPs 222, departure RUPs 224, and service RUPs 226 for use based on RUPs 238 determined for the set of LoLAs 240 and the set of gates 242 at vertiport 214.

This determination of the RUPs can also include vertiport resource mover 206 decimating portion 244 of arrival RUPs 222, departure RUPs 224, and service RUPs 226 available for use to form a set of decimated RUPs 246. The decimation of portion 244 of arrival RUPs 222, departure RUPs 224, and service RUPs 226 can increase flexibility to accommodate air traffic 218 when a set of unexpected events 248 occur that affect a use of maxrety 216 at vertiport 214.

As a result, remaining RUPs in arrival RUPs 222, and remaining RUPs in departure RUPs 224, and remaining RUPs in service RUPs 226 are arrival RUPs 222, departure RUPs 224, and service RUPs 226 that are available for use. Further, in the illustrative example, portion 244 can be any combination of arrival RUPs 222, departure RUPs 224, and service RUPs 226. Decimated RUPs 246 can be additional RUPs that can be used in case of undesired events and reduce issues caused by undesired events. These undesired events can be, for example without limitation, an unexpected unavailability of a LoLA, weather causing rerouting of air traffic 218 to vertiport 214, and undesired power supply to a gate, or other undesired event.

In another illustrative example, the determination of the RUPs can include vertiport resource mover 206 determining arrival RUPs 222, departure RUPs 224, and service RUPs 226 available for use based on RUPs 238 determined for the set of LoLAs 240 and the set of gates 242 at vertiport 214. Vertiport resource mover 206 can add buffer 250 to at least one of arrival RUPs 222, departure RUPs 224, and service RUPs 226.

As a result, the addition of the buffer 250 may reduce potential conflicting operations as well as issues and imbalances between arriving and departing traffic. Further, the use of buffer 250 can reduce need and frequency for large-scale replanning of air traffic between vertiports. In the illustrative example, buffer 250 can be any combination of arrival RUPs 222, departure RUPs 224, and service RUPs 226 and are additional RUPs added to the RUPs instead of a decimation of RUPs.

With respect to managing the allocation RUPs for air traffic 218 based on maxrety 216 determined from vertiport 214, vertiport resource mover 206 can perform reallocation 252 of at least one of arrival RUP 256 in arrival RUPs 222, departure RUP 258 in departure RUPs 224, or service RUP 260 in service RUPs 226 in response to a set of unexpected events 248 that affect maxrety 216 determined for vertiport 214. In this illustrative example, reallocation 252 is selected from at least one of reassigning arrival RUP 256, reassigning departure RUP 258, changing a duration of arrival RUP 256, changing a duration of departure RUP 258, changing a start time for arrival RUP 256, changing the start time for the departure RUP 258, assigning an unassigned departure RUP, assigning an unassigned arrival RUP, reassigning an assigned service RUP, changing a duration of the assigned service RUP, or assigning an unassigned gate.

In this illustrative example, the set of unexpected events can take a number of different forms. For example, the set of unexpected events 248 that affect maxrety 216 can be selected from at least one of a flight delay of a flight using an allocated RUP, a weather change, unexpected maintenance at the vertiport, an emergency request for the departure RUP, the emergency request for the arrival RUP, an unavailability of a flight arrival and takeoff area, an unavailability of a gate.

In managing allocation 220 of arrival RUPs 222, departure RUPs 224, and service RUPs 226 for air traffic 218 using vertiport 214 based on maxrety 216 determined for vertiport 214, vertiport resource mover 206 can designate at least one of arrival RUP 256, departure RUP 258, or service RUP 260 as reserved for use in managing allocation 220 of arrival RUPs 222, departure RUPs 224, and service RUPs 226 for air traffic 218 using vertiport 214 when a set of unexpected events 248 occur that affect maxrety 216.

Further, in managing allocation 220 of arrival RUPs 222, departure RUPs 224, and service RUPs 226 for air traffic 218 using vertiport 214 based on maxrety 216 determined for vertiport 214, vertiport resource mover 206 can receive request 262 to use vertiport 214 for a flight and identify available arrival RUPs 264, available departure RUPs 266, and available service RUPs 268 for meeting the request 262. Without limitation, request 262 to use vertiport 214 may be for an arrival time and duration for arrival RUP 256 and departure time and duration for departure RUP 258. Request 262 can also include a request for service RUP 260 or vertiport resource mover 206 can select service RUP 260 based on the request for arrival RUP 256 and departure RUP 258.

In another example, vertiport resource mover 206 can publish available arrival RUPs 264 to reservation system 270. Vertiport resource mover 206 can also publish available departure RUPs 266 to reservation system 270. In this example, request 262 to use vertiport 214 can be received by vertiport resource mover 206 from reservation system 270 and can comprise a selection of arrival RUP 256 and departure RUP 258 from published arrival RUPs and published departure RUPs.

Vertiport resource mover 206 can pre-allocate a set of the arrival RUPs 222, a set of departure RUPs 224, and a set of service RUPs 226 from the available arrival RUPs 264, available departure RUPs 266, and available service RUPs 268 for request 262. Vertiport resource mover 206 can allocate arrival RUP 256, departure RUP 258, and service RUP 260 in response to the flight being confirmed.

In one illustrative example, one or more technical solutions are present that overcome a technical problem with balancing capacity and demand at airports. As a result, one or more technical solutions can provide a technical effect of enabling an ability to increase the amount of traffic that can be handled through the tracking/allocation/control of RUPs for different operations at the vertiports.

In one illustrative example, arrival RUPs 222 are identified and tracked/allocated/controlled in addition to departure RUPs 224 at the vertiport. Further, the illustrative examples may allocate, track, direct, and/or control the allocation of service RUPs 226 at the vertiport. By managing the allocation of arrival RUPs 222 in addition to departure RUPs 224, the illustrative examples can enable balancing capacity and demand at a vertiport more efficiently as compared to techniques that only may allocate departure slots for aircraft departures in strategic timeframes such as mission planning.

Computer system 204 can be configured to perform at least one of the steps, operations, or actions described in the different illustrative examples using software, hardware, firmware or a combination thereof. As a result, computer system 204 operates as a special purpose computer system in which vertiport resource mover 206 in computer system 204 enables managing vertiport resources 212 in that it increases the ability of the vertiport to handle air traffic 218.

In particular, specially programed algorithms in code in vertiport resource mover 206 transform computer system 204 into a special purpose computer system configured to at least iteratively process multiple constraints convergence to derive a maximum utilization for resources associated with a network of aircraft and missions to derive maxrety 216 as compared to currently available general computer systems that do not have vertiport resource mover 206. Vertiport resource mover 206 is configured to update, within a minute, maxrety 216 for each vertiport in air vehicle resource movement environment 200 handling 4,000 flights within a 24 hour period.

In the illustrative example, the use of vertiport resource mover 206 in computer system 204 integrates processes into a practical application for managing vertiport resources. In other words, vertiport resource mover 206 in computer system 204 is directed to a practical application of processes integrated into vertiport resource mover 206 in computer system 204 that may determine a capacity for handling air traffic 218 and may allocate, track, direct, and/or control the allocation of arrival RUPs 222 based on maxrety 216. Additionally, vertiport resource mover 206 may allocate, track, direct, and/or control the allocation of departure RUPs 224 based on maxrety 216. As a result, managing of air traffic 218 in air vehicle resource movement environment 200 using vertiport resource movement system 202 can increase the amount of air traffic 218 that can be handled within any given time period 228 by air vehicle resource movement environment 200 overall and at any one vertiport within air vehicle resource movement environment 200 as compared to using current techniques.

The illustration of air vehicle resource movement environment 200 in FIG. 2 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, the allocating, tracking, directing, and/or controlling of vertiport resources 212 by vertiport resource mover 206 may be described with respect to vertiport 214. Vertiport resources 212 can be present for additional vertiports in addition to vertiport 214. Vertiport resource mover 206 or other vertiport resource movers may allocate, track, direct, and/or control vertiport resources 212 for those additional vertiports in addition to vertiport 214.

Figure 3:
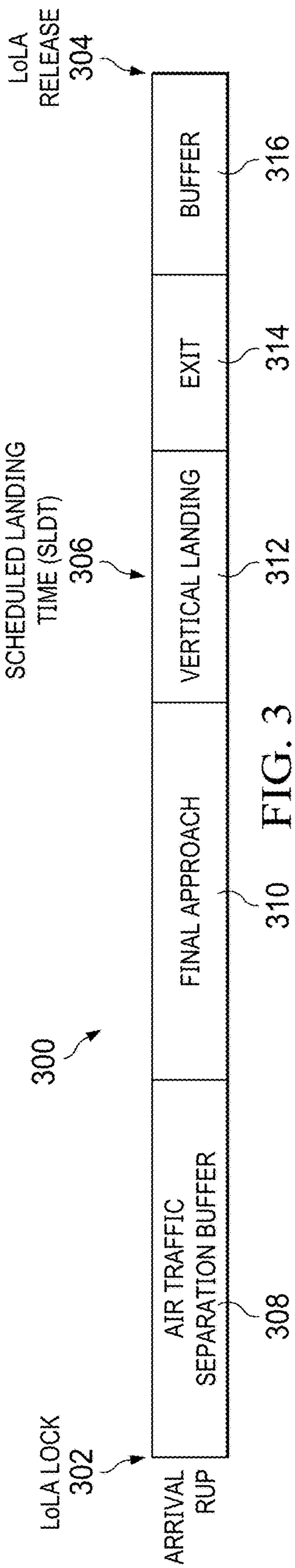
FIG. 3 is an illustration of an arrival Resource Utilization Period (RUP) in accordance with an illustrative example.

Turning next to FIG. 3, an illustration of an arrival RUP is depicted in accordance with an illustrative example. Arrival RUP 300 is an example of an arrival RUP 256 in FIG. 2. As depicted, arrival RUP 300 includes LoLA lock 302, LoLA release 304 and scheduled landing time (SLDT) 306. LoLA lock 302 is the time at which the LoLA is allocated/locked for arrival RUP 300. LoLA release 304 is the time at which the LoLA is unlocked and available. In other words, LoLA lock 302 and LoLA release 304 identified the beginning and ending of arrival RUP 300. Scheduled landing time (SLDT) 306 is the time at which the aircraft is scheduled to land at the LoLA.

Within arrival RUP 300, time periods are present for different operations that occur for arrival of an aircraft. As depicted, arrival RUP 300 is divided into time periods for different operations. For example, arrival RUP 300 comprises time periods for air traffic separation buffer 308, final approach 310, vertical landing 312, exit 314, and buffer 316.

Air traffic separation buffer 308 may be a portion of arrival RUP 300 allocated to provide extra time within arrival RUP 300 for a time delay not specifically anticipated. Without limitation, such a delay may be due to an arriving aircraft needing to maneuver to, without limitation, avoid other aircraft or adjust an alignment with final approach 310, delays due to passengers taking longer than expected to embark, variance in the flight time due to inaccuracies of the predictions of winds aloft, or any other irreducible uncertainty in the operations.

Final approach 310 is the time in arrival RUP 300 allocated for the aircraft to approach a LoLA. Final approach 310 may be considered similar to a published instrument approach procedure for an aircraft arriving at an airport from a final approach fix to a runway. Without limitation, final approach 310 may be expanded to also include time and distance similar to what aircraft currently fly as a standard terminal arrival (STAR) procedure into an airport. Vertical landing 312 is the time allocated for the aircraft to touchdown on the LoLA. Although vertical landing 312 is not equivalent to the current air traffic management term of an arrival slot it is the portion of arrival RUP 300 most aligned with a current slot. Current arrival slots may refer to as a whole number per hour at an airport and differ at least from vertical landing 312 portion of arrival RUP 300 because vertical landing 312 is defined by a specified duration of time within arrival RUP 300 associated with available RUPs of a given resource within a specified time period, such as without limitation RUPs for a LoLA within a 24 hour period. Exit 314 is time allocated for the aircraft to leave the LoLA, which can include receiving taxing in clearance and exiting the LoLA. One of ordinary skill in the art recognizes that without limitation, in some cases an aircraft may remain on a LoLA until it departs vertiport 214.

Buffer 316 can be used to provide a buffer in case of uncertainty in the periods of time predicted or estimated for the different operations in arrival RUP 300. A value for buffer 316 may vary dependent upon operations in planning mode 254 or execution mode 270. In other words, buffer 316 takes into account that some operations within arrival RUP 300 may take more time than anticipated. With buffer 316, reallocation of RUPs may be reduced or avoided when operations taking more time but do not cause the overall landing process to exceed the time allocated for arrival RUP 300. In other words arrival RUP 300 may include an excess time in its reservation window based on historical and/or predictive models of irreducible uncertainties in the operations. This "padding" reserve of a portion of a period for resource utilization may preclude normative variances in operations from inducing an excessive number of replanning events. In other planning mode 254 of vertiport resource movement system 202 is to build up the most accurate models of operational variances so as to make the irreducible uncertainties as small as possible, thereby maximizing timeliness of operations, which in turn maximizes the throughput of the operations.

The values of these different time periods in arrival RUP 300 can vary depending on a particular aircraft, LoLA, weather conditions, or other factors.

Figure 4:
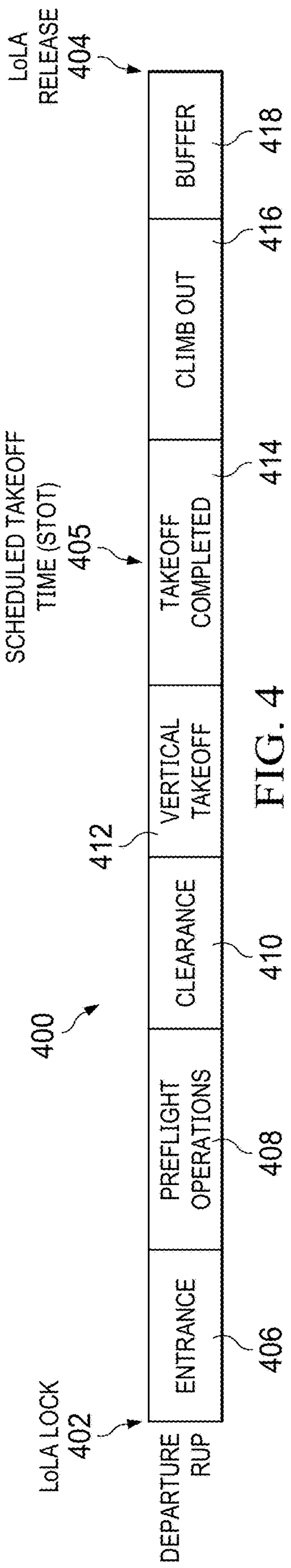
FIG. 4 is an illustration of a departure RUP in accordance with an illustrative example.

With reference to FIG. 4, an illustration of a departure RUP is depicted in accordance with an illustrative example. Departure RUP 400 is an example of departure RUP 258 in FIG. 2. As depicted, departure RUP 400 includes LoLA lock 402, LoLA release 404 and scheduled takeoff time (STOT) 405. Hence, LoLA lock 402 is the time at which the LoLA is locked for departure RUP 400. LoLA release 404 is the time at which the LoLA is unlocked and available. Scheduled takeoff time (STOT) 405 is the time at which the aircraft is scheduled to takeoff from the LoLA.

Within departure RUP 400, time periods are present for different operations that occur for the departure of an aircraft. As depicted, departure RUP 400 includes time periods for entrance 406, preflight operations 408, clearance 410, vertical takeoff 412, takeoff completed 414, safe separation 416, buffer 418.

In this example, entrance 406 is the time allocated for the vehicle to enter the LoLA. Without limitation, these operations can include, for example, air vehicle 104 towing into LoLA 240 and detachment from a tow that moves air vehicle 104 into LoLA 240. Preflight operations 408 is the time period for various operations prior to takeoff final preflight checks, or other operations. Other operations may include without limitation changing: a load on air vehicle 104, or a fueling and/or charging, and/or other servicing of air vehicle 104.

Clearance 410 is the time period during which clearance for takeoff is given. Vertical takeoff 412 is time allocated for the aircraft to take off, and takeoff completed 414 is the time during which the aircraft has taken off but is still over the LoLA. Although vertical takeoff 412 is not equivalent to the current air traffic management term of a departure slot it is the portion of departure RUP 400 most aligned with a current departure slot. Current departure slots may refer to as a whole number per hour at an airport and differ at least from vertical takeoff 412 portion of departure RUP 400 because vertical takeoff 412 is defined by a specified duration of time within departure RUP 400 associated with available RUPs of a given resource within a specified time period, such as without limitation RUPs for a LoLA within a 24 hour period.

Climb out 416 is the time during which the aircraft moves to a safe distance away from the LoLA. Climb out 416 may be considered similar to a standard instrument departure (SID) currently flown by an aircraft from an airport. Buffer 418 is additional time that can be added to take into account the different operations may take more time than anticipated. In other words arrival RUP 400 may include an excess time in its reservation window based on historical and/or predictive models of irreducible uncertainties in the operations. This "padding" reserve of a portion of a period for resource utilization may preclude normative variances in operations from inducing an excessive number of replanning events. In other planning mode 254 of vertiport resource movement system 202 is to build up the most accurate models of operational variances so as to make the irreducible uncertainties as small as possible, thereby maximizing timeliness of operations, which in turn maximizes the throughput of the operations.

Figure 5:
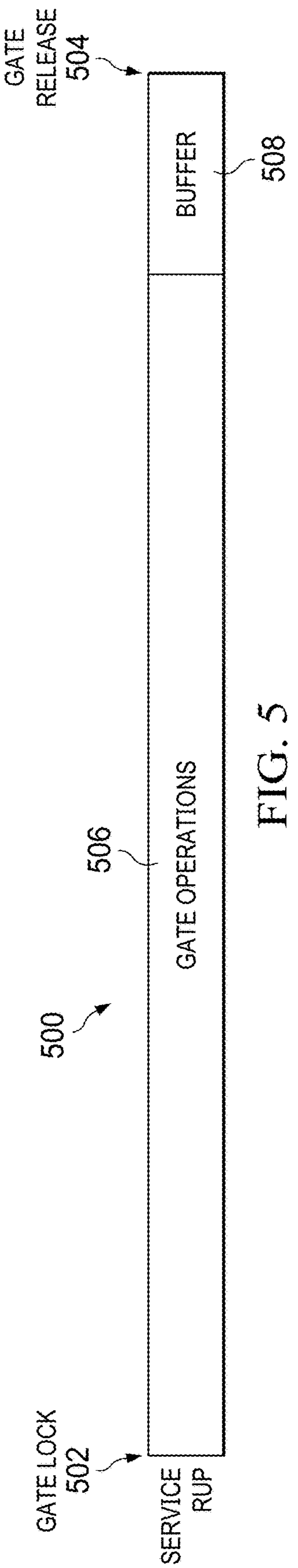
FIG. 5 is an illustration of a service RUP in accordance with an illustrative example.

Turning now to FIG. 5, an illustration of a service RUP is depicted in accordance with an illustrative example. As depicted, service RUP 500 includes gate lock 502 and gate release 504. Gate lock 502 is a time at which service RUP 500 begins and the gate is locked for use by service RUP 500. Gate release 504 is the time at which service RUP 500 ends and the gate is released for use.

In this illustrative example, gate operations 506 occur within service RUP 500. These different service operations can include, for example, refueling, inspections, maintenance, deplaning, onboarding, loading and/or unloading cargo, or other suitable operations. As depicted, service RUP 500 also includes buffer 508 in addition to gate operations 506. Buffer 508 provides additional time as buffer for cases in which gate operations 506 may take more time than predicted or expected. Buffer 316, buffer 418, and/or buffer 508, may each be adjusted dynamically.

Adjustment of buffer 316, buffer 418, and/or buffer 508, may be based upon without limitation a status of any of resources associated with operation of an aircraft. As a nonlimiting example, buffer 316, buffer 418, and/or buffer 508, may be adjusted based upon a type/model/mission of an aircraft. As a nonlimiting example, buffer 316, buffer 418, and/or buffer 508, may be adjusted based upon a type and/or a weight and/or other characteristics of a cargo loaded on an aircraft. Adjustment of buffer 316, buffer 418, and/or buffer 508, may be based upon without limitation a time of day and/or a weather condition. Adjustment of buffer 316, buffer 418, and/or buffer 508, may be made independently for each operation of any particular flight of an aircraft.

The illustration of the different RUPs in FIGS. 3-5 are provided as a depiction of some examples in which RUPs can be implemented. These illustrations are not meant to limit the manner in which RUPs can be implemented in other examples. For example, a buffer can be omitted in a RUP. As another example, a service RUP can be performed on a LoLA instead of the gate when a gate is unavailable. As another example, vertical takeoff may also be considered to include completion of the take off while the aircraft is flying away from the LoLA.

Figure 6:
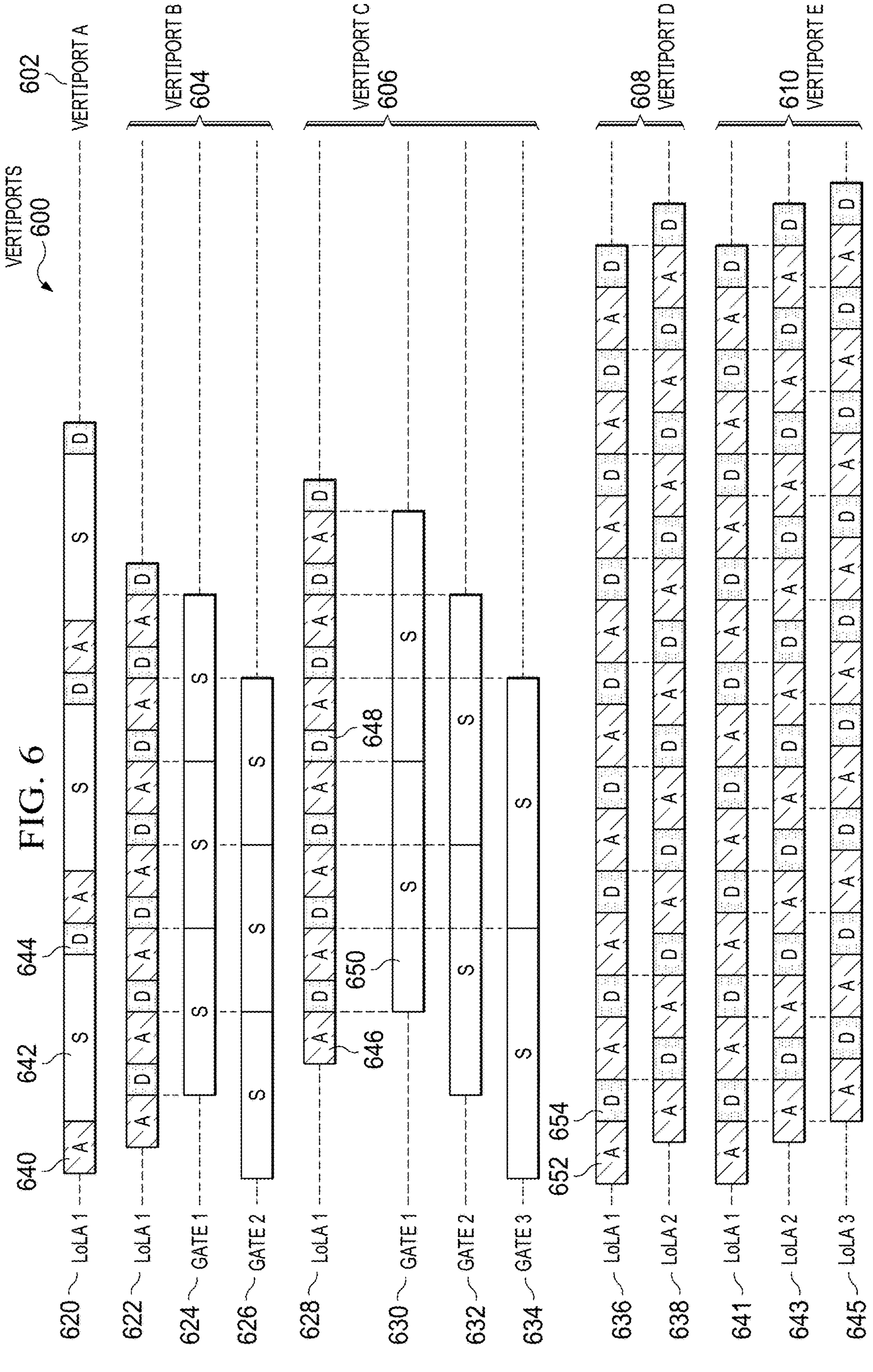
FIG. 6 is an illustration of RUPs allocated for vertiports in accordance with an illustrative example.

Turning now to FIG. 6, an illustration of RUPs allocated for vertiports is depicted in accordance with an illustrative example. As depicted, an allocation of RUPs is depicted for vertiports 600. Vertiports 600 comprises vertiport A 602, vertiport B 604, vertiport C 606, vertiport D 608, and vertiport E 610.

As depicted, vertiport A 602 has a single LoLA, LoLA 1 620 and does not have a gate. Vertiport B 604 has a single LoLA, LoLA 1 622, and two gates, gate 1 624 and gate 2 626. Vertiport C 606 has a single LoLA, LoLA 1 628, and three gates, gate 1 630, gate 2 632, and gate 3 634.

As illustrated, vertiport D 608 has two LoLAs, LoLA 1 636 and LoLA 2 638. In this example, vertiport E 610 has three LoLAs, LoLA 1 641, LoLA 2 643, and LoLA 3 645.

In this illustrative example, the different vertiports have arrival RUPs and departure RUPs. Some vertiports also include service RUPs. As depicted, arrival RUPs are indicated by "A", departure RUPs are indicated by "D", and service RUPs are indicated by "S".

As depicted in this example, without gates being present at vertiport A 602, LoLA 1 620 has arrival RUPs, service RUPs, and departure RUPs. For example, LoLA 1 620 at vertiport A 602 has RUPs such as arrival RUP 640, service RUP 642, and departure RUP 644. With this example, an aircraft can land during arrival RUP 640, be serviced during service RUP 642, and takeoff during departure RUP 644 all at LoLA 1 620.

As another example, vertiport C has arrival RUPs, service RUPs, and departure RUPs. Arrival RUPs and departure RUPs use LoLA 1 628. For example, LoLA 1 628 has arrival RUP 646 and departure RUP 648. Gate 1 630 has service RUP 650. In this example, an aircraft can land during arrival RUP 646 at LoLA 1 628. The aircraft can then be serviced during service RUP 650 at gate 1 630 and then returned to LoLA 1 628 and take off during departure RUP 648.

As another example, vertiport D 608 has arrival RUPs and departure RUPs and does not include service RUPs. For example, LoLA 1 636 at vertiport D 608 has arrival RUP 652 and departure RUP 654. An aircraft can land on LoLA 1 636 during arrival RUP 652 and takeoff during departure RUP 654. Each of these RUPs can include time for deplaning or onboarding passengers or for unloading and loading of cargo.

The RUPs at vertiports 600 can be allocated/tracked/directed/controlled using a vertiport resource mover in a vertiport management machine such as vertiport resource mover 206 and vertiport resource movement system 202 in FIG. 2. The tracking/direction/control includes the allocation of arrival RUPs and departure RUPs for at vertiport A 602, vertiport B 604, and vertiport C 606, vertiport D 608, and vertiport E 610. Additionally, when service RUPs are present or available, the allocation of RUPs can also include allocating service RUPs such as those at vertiport A 602, vertiport B 604, and vertiport C 606.

Figure 7:
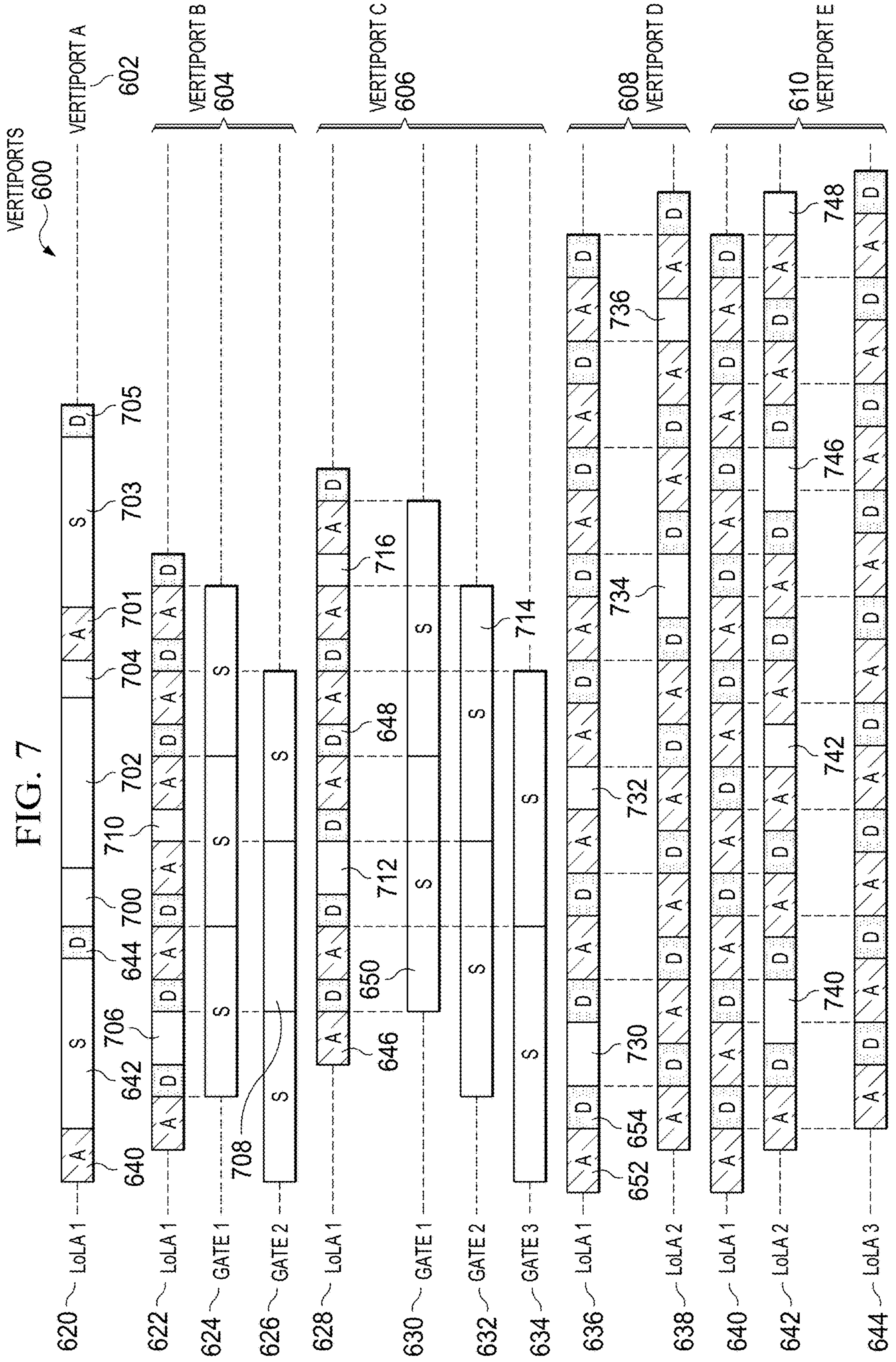
FIG. 7 is an illustration of RUPs including decimated RUPs in accordance with an illustrative example.

Turning to FIG. 7, an illustration of RUPs including decimated RUPs is depicted in accordance with an illustrative example. When operating a vertiport at full theoretical capacity, delays cannot be tolerated and can propagate and affect other flights in vertiports. As noted above, to account for delays, a buffer can be added to an arrival/departure/service RUP to increase flexibility in case of unexpected changes in the amount of time needed to perform the operations within the RUP.

As another illustrative example, RUP decimation can be performed in which RUPs are decimated or removed from being available for use. RUP decimation provides another level of granularity to ensure additional flexibility to accommodate unexpected events such as missed departure, or late arrival that does not fall within the allocated RUPs for the departure or arrival. As another example, RUP decimation can provide flexibility to take into account unexpected landings or rerouting of flights due to weather and/or other potential causes such as without limitation a mechanical issue.

In this illustrative example, RUP decimation for vertiports 600 provides additional flexibility in LoLA and thus an overall vertiport capacity and availability in case of unexpected events. As depicted, arrival RUP 700, service RUP 702, and departure RUP 704 for LoLA 1 620 at Vertiport A 602 have been decimated.

When a RUP is decimated, the RUP has been removed from being allocated for use in managing air traffic on a scheduled basis. In other words, the time period for that RUP can be used for other purposes such as shifting other RUPs if delays or other unexpected events occur.

For example, when an aircraft scheduled to take off during departure RUP 644 is delayed for mechanical or maintenance reasons and does not take off during the time period for departure RUP 644, the use of decimated RUPs can prevent or reduce the rescheduling of other flights using LoLA 1 620. For example, with the decimation of arrival RUP 700, service RUP 702, and departure RUP 704, departure RUP 644 can be shifted or extended into the time for at least one of arrival RUP 700, service RUP 702, or departure RUP 704 without affecting subsequent RUPs such as arrival RUP 701, service RUP 703, and departure RUP 705 for LoLA 1 620.

With vertiport B 604, arrival RUP 706 for LoLA 1 622 and departure RUP 710 for LoLA 1 610 been decimated—meaning those RUPs are not available for scheduling an arrival or departure. Service RUP 708 for gate 2 626 has been decimated for vertiport B 604—meaning gate 2 626 is not available for scheduled use during the time period assigned to service RUP 708.

For vertiport C 606, arrival RUP 712 for LoLA 1 628, service RUP 714 for gate 2 632, and departure RUPs 716 for LoLA 1 628 have been decimated. As can be seen, the RUPs decimated in this example are selected such that the selection of an arrival RUP for decimation corresponds to the service RUP and departure RUP that would follow from the arrival RUP.

In vertiport D 608, arrival RUP 730 and departure RUP 732 for LoLA 1 636 and been decimated, and arrival RUP 734 and departure RUPs 736 for LoLA 2 638 have been decimated. As depicted for vertiport E 610, arrival RUP 740, departure RUP 742, arrival RUP 746, and departure RUP 748 in LoLA 2 643 have been decimated.

As a result, the decimation of these RUPs at the different vertiports can increase the tolerance that is present in the allocation of RUPs in response to unexpected events. For example, without limitation, weather, debris on a LoLA, maintenance delays, and other events can occur without having an that requires to readjustment or reallocation of RUPs the different vertiports.

The illustration of illustrated RUPs for vertiports in FIG. 6 and RUP decimation in FIG. 7 are provided for purposes of demonstrating one implementation for an illustrative example. Although the different types of RUPs are all shown as having equal durations. RUPs of a particular category can have different durations in other illustrative examples. For example, a RUP can have different durations depending on, without limitation, the type of aircraft assigned to the RUP. For example, a larger cargo aircraft may require a longer duration for a service RUP as compared to a smaller two passenger aircraft.

This illustration of RUPs and the decimation RUPs is not meant to limit the manner in which other illustrative examples can be implemented. For example, RUPs can also be decimated (not shown) for LoLA 3 644 at vertiport E 610.

Figure 8:
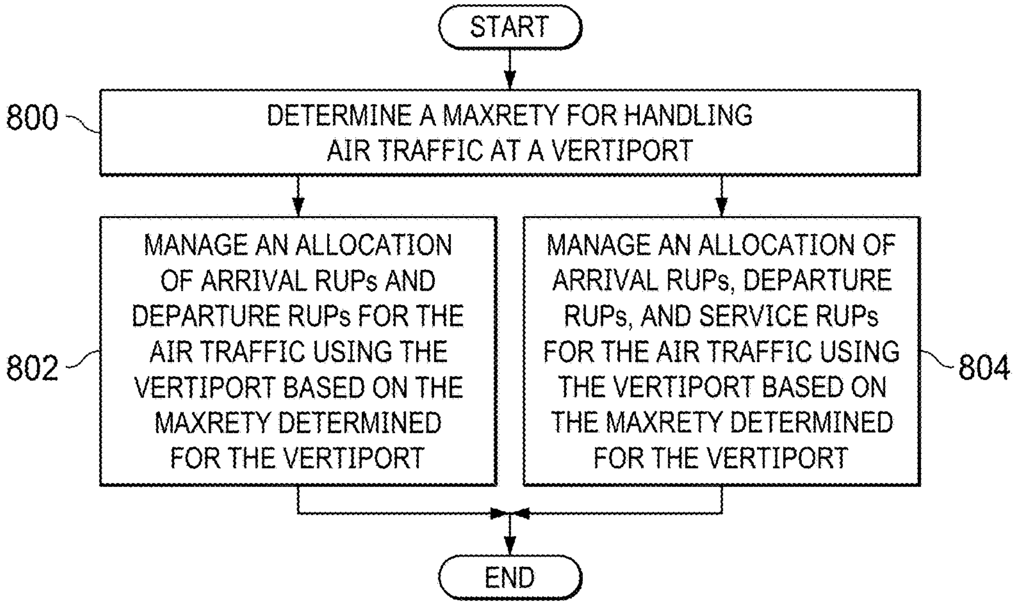
FIG. 8 is an illustration of a flowchart of a process for managing vertiport resources in accordance with an illustrative example.

Turning next to FIG. 8, an illustration of a flowchart of a process for managing vertiport resources is depicted in accordance with an illustrative example. The process in FIG. 8 can be implemented in hardware, software, or both. When implemented in software, the process can take the form of program code that is run by one of more processor units located in one or more hardware devices in one or more computer systems. For example, the process can be implemented in vertiport resource mover 206 in computer system 204 in FIG. 2.

The process begins by determining a capacity for handling air traffic at a vertiport (operation 800). The process may allocate, track, direct, and/or control an allocation of arrival RUPs and departure RUPs for the air traffic using the vertiport based on the capacity determined for the vertiport (operation 802) the process terminates thereafter. In another illustrative example, the process directs/controls an allocation of arrival RUPs, departure RUPs, and service RUPs for the air traffic using the vertiport based on the capacity determined for the vertiport (operation 804). This operation can be performed in place of operation 802 in some illustrative examples.

Figure 9:
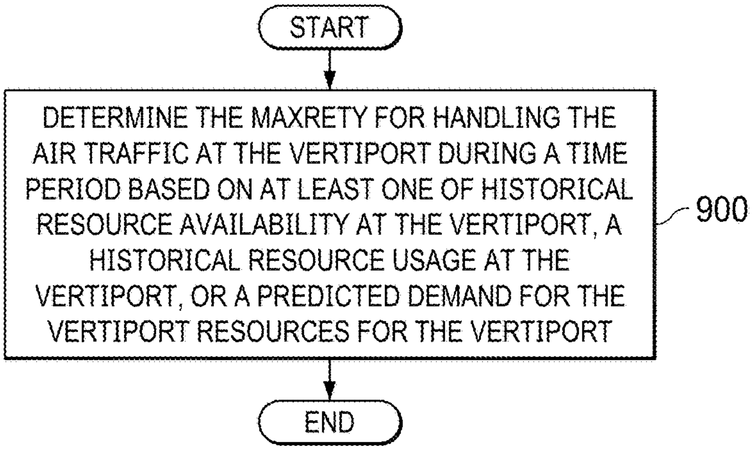
FIG. 9 is an illustration of a flowchart of a process for determining capacity at a vertiport in accordance with an illustrative example.

With reference to FIG. 9, an illustration of a flowchart of a process for determining capacity at a vertiport is depicted in accordance with an illustrative example. The process in FIG. 9 is an example of an implementation for operation 800 in FIG. 8.

The process determines the capacity for handling the air traffic at the vertiport during a time period based at least on one of historical resource availability at the vertiport, a historical resource usage at the vertiport, or a predicted demand for the vertiport resources for the vertiport (operation 900). The process terminates thereafter.

Figure 10:
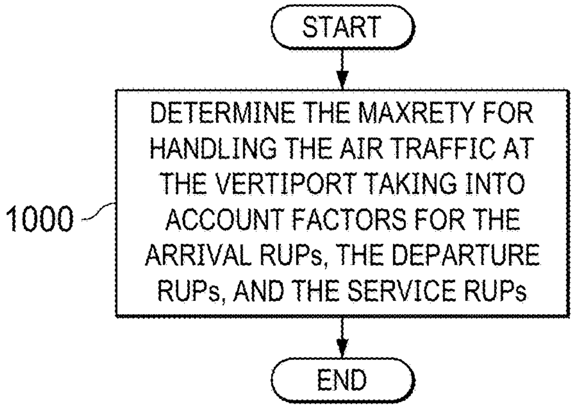
FIG. 10 is an illustration of a flowchart of a process for determining capacity at a vertiport in accordance with an illustrative example.

In FIG. 10, an illustration of a flowchart of a process for determining capacity at a vertiport is depicted in accordance with an illustrative example. The process in FIG. 10 is another example of an implementation for operation 800 in FIG. 8.

The process determines the capacity for handling the air traffic at the vertiport taking into account factors for the arrival RUPs, the departure RUPs, and the service RUPs (operation 1000). The process terminates thereafter. In this illustrative example, the factors comprise at least one of: a taxiing time, a boarding time, a disembarkation time, a gate occupancy time, a battery charging time, a potential conflict check time, a turnaround time, a number of vehicles (282) such as without limitation passenger air vehicles, a type of vehicle, a number of LoLAs at the vertiport, a number of gates at the vertiport, a number of vehicles expected in a day, a noise regulation, or some other factor that can affect the use or availability of different RUPs.

Without limitation, the noise regulation may include an airport curfew. An airport curfew may prohibit utilization of some vertiport resources 212 at vertiport 214, such as without limitation certain and/or LoLAs for an extended time period 228. Without limitation the noise regulation may include restrictions on paths/locations and or time period 228 available for utilization as final approach 310, climb out 416, and or operation of certain ground/service equipment. Hence, noise regulations may reduce availability of certain RUPs for certain resources with an end effect similar to decimated RUPs 246.

Figure 11:
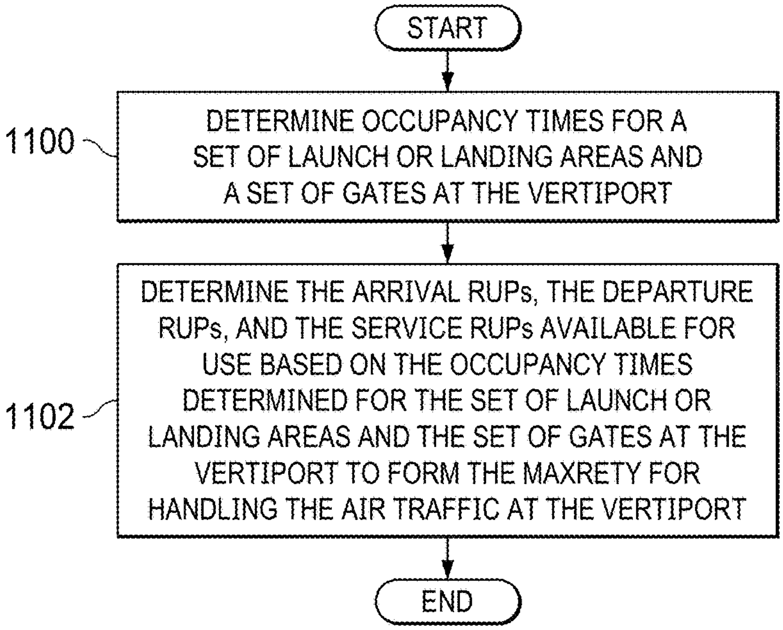
FIG. 11 is an illustration of a flowchart of a process for determining capacity at a vertiport in accordance with an illustrative example.

With reference next to FIG. 11, an illustration of a flowchart of a process for determining capacity at a vertiport is depicted in accordance with an illustrative example. The process in FIG. 11 is another example of an implementation for operation 800 in FIG. 8.

The process may begin by determining occupancy times for a set of LoLAs and a set of gates at the vertiport (operation 1100). The process determines the arrival RUPs, the departure RUPs, and the service RUPs available for use based on the occupancy times determined for the set of LoLAs and the set of gates at the vertiport to form the capacity for handling the air traffic at the vertiport (operation 1102). The process terminates thereafter.

Figure 12:
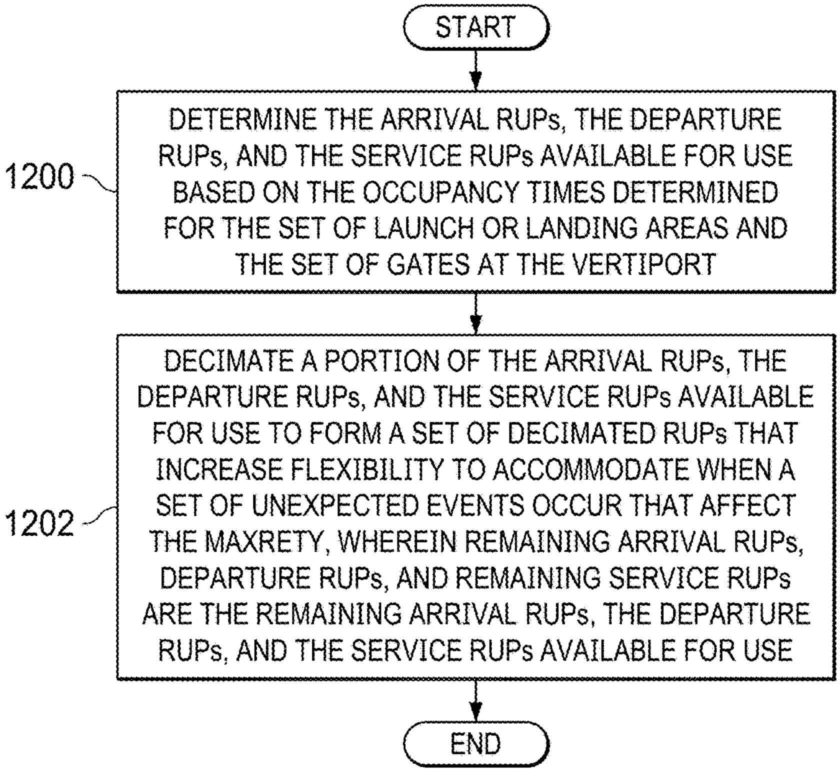
FIG. 12 is an illustration of a flowchart of a process for determining the arrival RUPs, the departure RUPs, and the service RUPs available for use in accordance with an illustrative example.

Turning to FIG. 12, an illustration of a flowchart of a process for determining the arrival RUPS, the departure RUPs, and the service RUPs available for use is depicted in accordance with an illustrative example. The process in FIG. 12 is an example of an implementation for operation 1102 in FIG. 11.

The process determines the arrival RUPs, the departure RUPs, and the service RUPs available for use based on the occupancy times determined for the set of LoLAs and the set of gates at the vertiport (operation 1200). The process decimates a portion of the arrival RUPs, the departure RUPs, and the service RUPs available for use to form a set of decimated RUPs that increase flexibility to accommodate when a set of unexpected events occur that affect the capacity, wherein remaining arrival RUPs, remaining departure RUPs, and remaining service RUPs are the arrival RUPs, the departure RUPs, and the service RUPs available for use (operation 1202). The process terminates thereafter.

Figure 13:
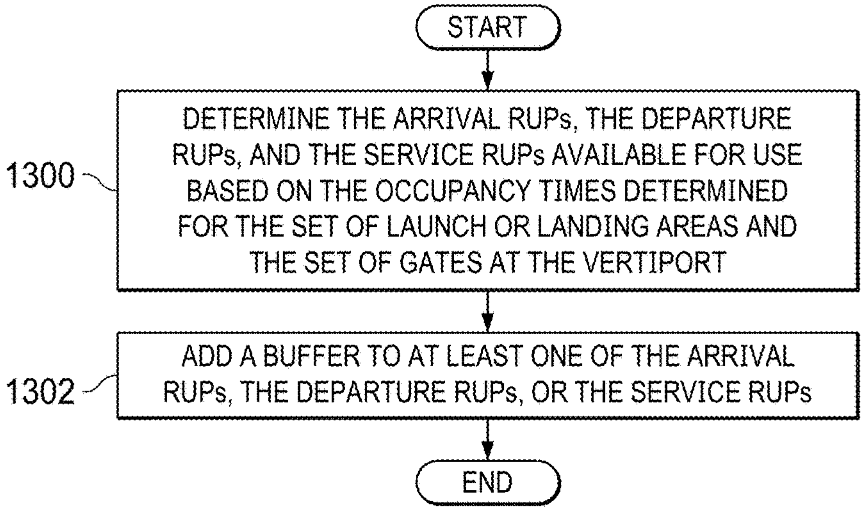
FIG. 13 is an illustration of a flowchart of a process for determining the arrival RUPs, the departure RUPs, and the service RUPs available for use in accordance with an illustrative example.

Turning now to FIG. 13, an illustration of a flowchart of a process for determining the arrival RUPS, the departure RUPs, and the service RUPs available for use is depicted in accordance with an illustrative example. The process in FIG. 13 is another example of an implementation for operation 1102 in FIG. 11.

The process begins by determining the arrival RUPs, the departure RUPs, and the service RUPs available for use based on the occupancy times determined for the set of LoLAs and the set of gates at the vertiport (operation 1300). The process adds a buffer to at least one of the arrival RUPs, the departure RUPs, or the service RUPs (operation 1302). The process terminates thereafter.

Figure 14:
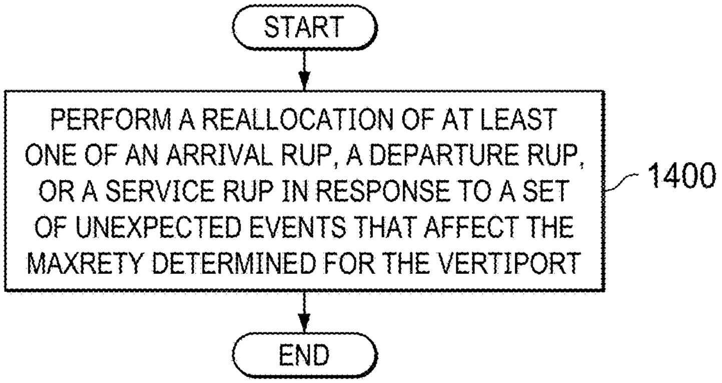
FIG. 14 is an illustration of a flowchart of a process for managing the allocation of the arrival RUPs, the departure RUPs, and the service RUPs in accordance with an illustrative example.

Turning next to FIG. 14, an illustration of a flowchart of a process for managing the allocation of the arrival RUPs, the departure RUPs, and the service RUPs is depicted in accordance with an illustrative example. The process in FIG. 14 is an example of an implementation for operation 802 in FIG. 8.

The process performs a reallocation of at least one of an arrival RUP, a departure RUP, or a service RUP in response to a set of unexpected events that affect the capacity determined for the vertiport (operation 1400). The process terminates thereafter.

In operation 1400, the reallocation can be performed in a number of different ways. For example, reallocation can be selected from at least one of reassigning the arrival RUP, reassigning the departure RUP, changing a duration of the arrival RUP, changing a duration of the departure RUP, changing a start time for the arrival RUP, changing the start time for the departure RUP, assigning an unassigned departure RUP, assigning an unassigned arrival RUP, reassigning an assigned service RUP, changing a duration of the assigned service RUP, assigning an unassigned gate, or some other type of RUP reallocation.

Further, the set of unexpected events that affect the capacity can be selected from at least one of a flight delay of a flight using an allocated RUP, a weather change, unexpected maintenance at the vertiport, an emergency request for the departure RUP, an emergency request for the arrival RUP, an unavailability of a final approach and takeoff area, an unavailability of a gate, or some other unexpected event.

Figure 15:
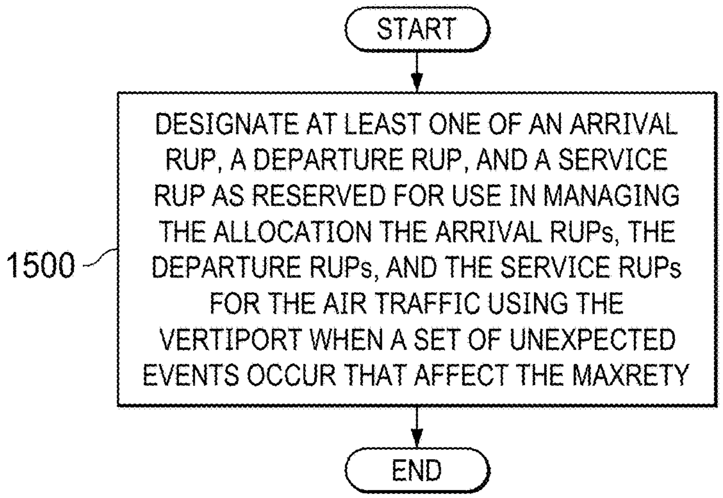
FIG. 15 is an illustration of a flowchart of a process for managing the allocation of the arrival RUPs, the departure RUPs, and the service RUPs in accordance with an illustrative example.

With reference to FIG. 15, an illustration of a flowchart of a process for managing the allocation of the arrival RUPs, the departure RUPs, and the service RUPs is depicted in accordance with an illustrative example. The process in FIG. 15 is another example of an implementation for operation 802 in FIG. 8.

The process designates at least one of an arrival RUP, a departure RUP, and a service RUP as reserved for use in managing the allocation the arrival RUPs, the departure RUPs, and the service RUPs for the air traffic using the vertiport when a set of unexpected events occur that affect the capacity (operation 1500). The process terminates thereafter.

Figure 16:
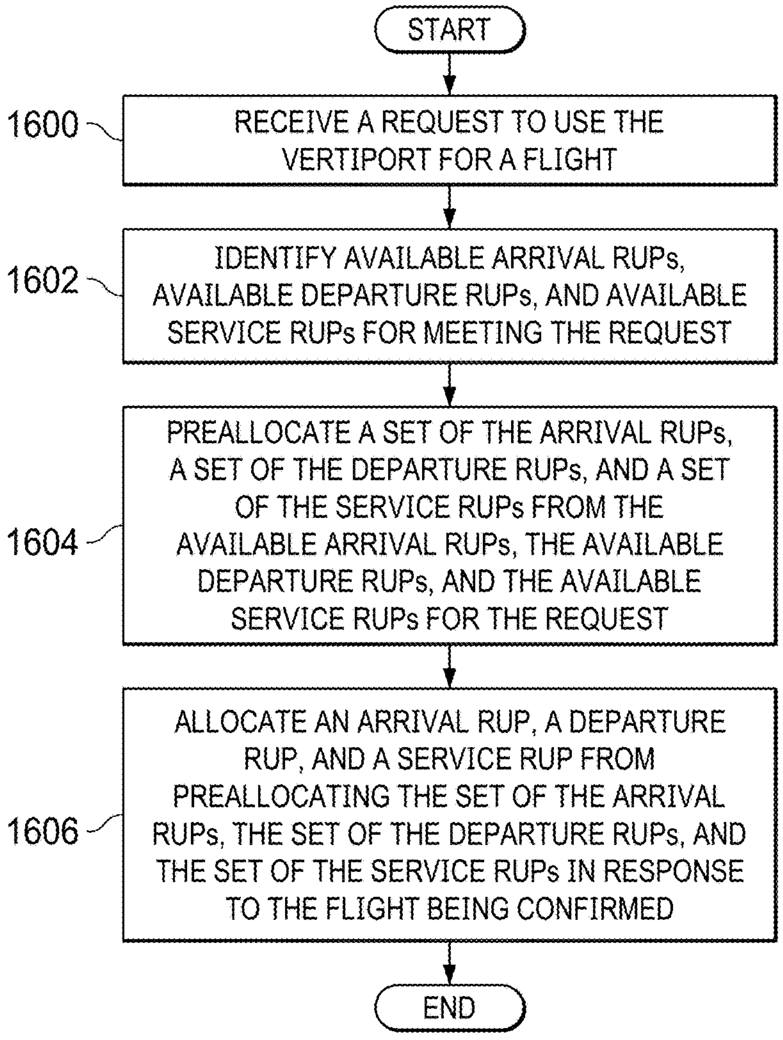
FIG. 16 is an illustration of a flowchart of a process for managing the allocation of the arrival RUPs, the departure RUPs, and the service RUPs in accordance with an illustrative example.

Turning now to FIG. 16, an illustration of a flowchart of a process for managing the allocation of the arrival RUPs, the departure RUPs, and the service RUPs is depicted in accordance with an illustrative example. The process in FIG. 16 is yet another example of an implementation for operation 802 in FIG. 8.

The process begins by receiving a request to use the vertiport for a flight (operation 1600). In operation 1600, the request to use the vertiport can comprise an arrival time and duration for an arrival RUP and a departure time and duration for a departure RUP. In another illustrative example, the request to use the vertiport can comprise selection of an arrival RUP and a departure RUP from published arrival RUPs and published departure RUPs.

The process identifies available arrival RUPs, available departure RUPs, and available service RUPs for meeting the request (operation 1602). The process pre-allocates before their utilization a set of the arrival RUPs, a set of the departure RUPs, and a set of the service RUPs from the available arrival RUPs, the available departure RUPs, and the available service RUPs for the request (operation 1604).

The process allocates an arrival RUP, a departure RUP, and a service RUP pre-allocating the set of the arrival RUPs, a set of the departure RUPs, and a set of the service RUPs in response to the flight being confirmed (operation 1606). The process terminates thereafter.

Figure 17:
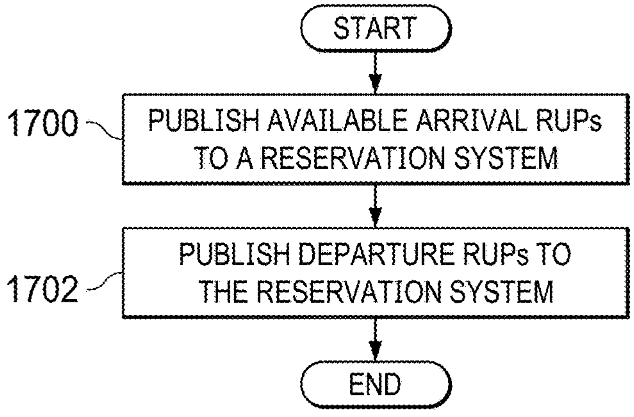
FIG. 17 is an illustration of a flowchart of a process for managing the allocation of the arrival RUPs, the departure RUPs, and the service RUPs in accordance with an illustrative example.

With reference to FIG. 17, an illustration of a flowchart of a process for managing the allocation of the arrival RUPs, the departure RUPs, and the service RUPs is depicted in accordance with an illustrative example. The process in FIG. 17 is an example of additional operations that can be performed with the operations in FIG. 8.

The process publishes available arrival RUPs to a reservation system (operation 1700). The process publishes departure RUPs to the reservation system (operation 1702). The process terminates thereafter.

Figure 18:
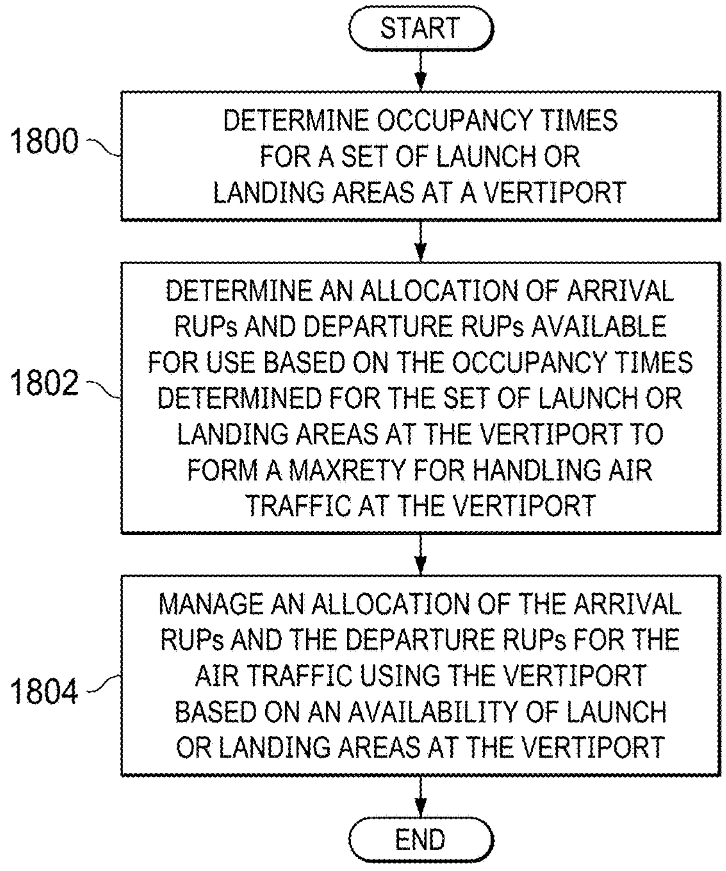
FIG. 18 is an illustration of a flowchart of a process for managing vertiport resources in accordance with an illustrative example.

Turning next to FIG. 18, an illustration of a flowchart of a process for managing vertiport resources is depicted in accordance with an illustrative example. The process in FIG. 18 can be implemented in hardware, software, or both. When implemented in software, the process can take the form of program code that is run by one of more processor units located in one or more hardware devices in one or more computer systems. For example, the process can be implemented in vertiport resource mover 206 in computer system 204 in FIG. 2.

The process begins by determining occupancy times for a set of LoLAs at a vertiport (operation 1800). In operation 1800, the process can also take into account the presence of gates and determines occupancy times for a set of LoLAs and a set of gates at a vertiport.

The process determines an allocation of arrival RUPs and departure RUPs available for use based on the occupancy times determined for the set of LoLAs at the vertiport to form a capacity for handling air traffic at the vertiport (operation 1802). In operation 1802, the process can also take into account the presence of gates and determines an allocation of arrival RUPs, departure RUPs, and service RUPs available for use based on the occupancy times determined for the set of LoLAs and the set of gates at the vertiport to form a capacity for handling air traffic at the vertiport.

The process may track, direct, and/or control an allocation of the arrival RUPs and the departure RUPs for the air traffic using the vertiport based on an availability of LoLAs at the vertiport (operation 1804). The process terminates thereafter. In operation 1804 when service RUPs and gates are present, the process may allocate, track, direct, and/or control an allocation of the arrival RUPs, the departure RUPs, and service RUPs for the air traffic using the vertiport based on an availability of LoLAs and the set of gates at the vertiport.

In some illustrative examples, the process may allocate, track, direct, and/or control the allocation of arrival RUPs and departure RUPs and can also include tracking, directing, and/or controlling, the allocation of service RUPs. In this example, service RUPs may or may not be a limiting factor in assigning arrival RUPs and departures RUPs.

Figure 19:
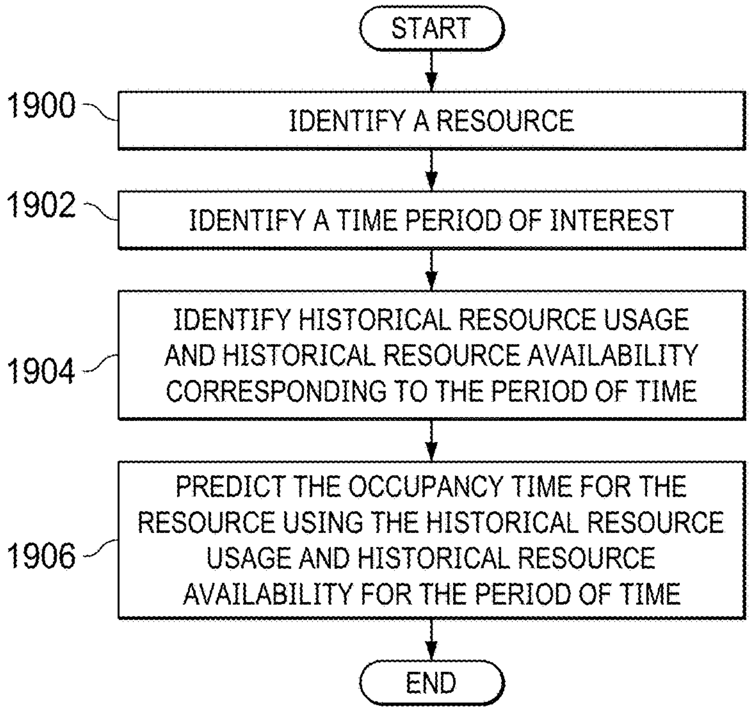
FIG. 19, is an illustration of a flowchart of process for determining occupancy time is depicted in accordance with an illustrative example.

Turning next to FIG. 19, an illustration of a flowchart of process for determining occupancy time is depicted in accordance with an illustrative example. This process is an example of an implementation for operation 1100 in FIG. 11 and operation 1800 in FIG. 18.

The process may begin by identifying a resource (operation 1900). In operation 1900, the resource can be a LoLA, a gate, or other resource which an aircraft can occupy.

The process identifies a time period of interest (operation 1902). In this illustrative example, the time period of interest is a future period of time and can be, for example, an hour, 12 hours, a day, a week, or some other period of time.

The process identifies historical resource usage and historical resource availability corresponding to the period of time (operation 1904). For example, if the time period is for a day of the week, such as Tuesday, historical resource usage and historical resource availability can be identified for Tuesdays. As another example, the historical resource usage and historical resource availability can be determined for the period of time from 6:00 am to 12:00 pm on a daily basis. In yet another illustrative example, the historical resource usage and historical resource availability can be evaluated for Tuesdays in June.

The process predicts the occupancy time for the resource using the historical resource usage and historical resource availability for the period of time (operation 1906). The process terminates thereafter.

This prediction can be made in a number of different ways. For example, an artificial intelligence system can be used to predict occupancy times. For example, a machine learning model can be used to predict occupancy times during the selected period of time.

An artificial intelligence system is a system that has intelligent behavior and can be based on the function of a human brain. An artificial intelligence system comprises without limitation at least one of: an artificial neural network, a cognitive system, a Bayesian network, a fuzzy logic, an expert system, a natural language system, or some other suitable system. Machine learning can be used to train the artificial intelligence system. Machine learning involves inputting data to the process and allowing the process to adjust and improve the function of the artificial intelligence system.

A machine learning model is a type of artificial intelligence model that can learn without being explicitly programmed. A machine learning model can learn based on training data input into the machine learning model. The machine learning model can learn using various types of machine learning algorithms. The machine learning algorithms include without limitation at least one of: a supervised learning, an unsupervised learning, a feature learning, a sparse dictionary learning, an anomaly detection, association rules, or other types of learning algorithms. Examples of machine learning models include without limitation: an artificial neural network, a decision tree, a support vector machine, a Bayesian network, a genetic algorithm, and other types of models. These machine learning models can be trained using data and process additional data to provide a desired output.

This process can be repeated to identify occupancy time for LoLAs, gates, or other areas. This information can then be used to may allocate, track, direct, and/or control the allocation of RUPs at the vertiport.

The flowcharts and block diagrams in the different depicted embodiments illustrate the architecture, functionality, and operation of some possible implementations of apparatuses and methods in an illustrative example. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative example, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 20:
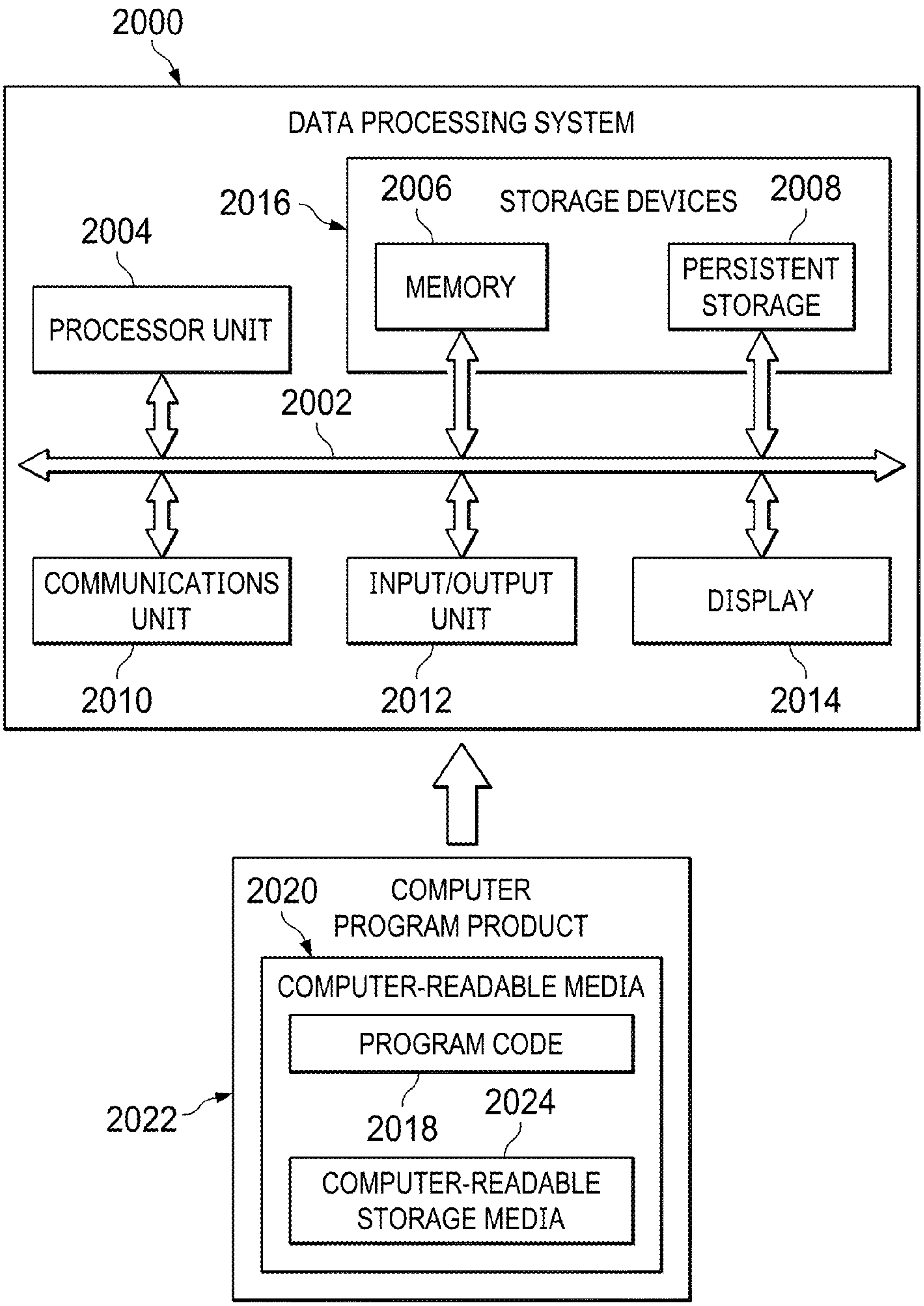
FIG. 20 is an illustration of a block diagram of a data processing system in accordance with an illustrative example.

Turning now to FIG. 20, an illustration of a block diagram of a data processing system is depicted in accordance with an illustrative example. Data processing system 2000 can be used to implement computer system 204 in FIG. 2. In this illustrative example, data processing system 2000 includes communications framework 2002, which provides communications between processor unit 2004, memory 2006, persistent storage 2008, communications unit 2010, input/output (I/O) unit 2012, and display 2014. In this example, communications framework 2002 takes the form of a bus system.

Processor unit 2004 serves to execute instructions for software that can be loaded into memory 2006. Processor unit 2004 includes one or more processors. For example, processor unit 2004 can be selected from at least one of a multicore processor, a central processing unit (CPU), a graphics processing unit (GPU), a physics processing unit (PPU), a digital signal processor (DSP), a network processor, or some other suitable type of processor. Further, processor unit 2004 can may be implemented using one or more heterogeneous processor systems in which a main processor is present with secondary processors on a single chip. As another illustrative example, processor unit 2004 can be a symmetric multi-processor system containing multiple processors of the same type on a single chip.

Memory 2006 and persistent storage 2008 are examples of storage devices 2016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2016 may also be referred to as computer-readable storage devices in these illustrative examples. Memory 2006, in these examples, can be, for example, a random-access memory or any other suitable volatile or non-volatile storage device. Persistent storage 2008 can take various forms, depending on the particular implementation.

For example, persistent storage 2008 may contain one or more components or devices. For example, persistent storage 2008 can be a hard drive, a solid-state drive (SSD), a flash memory, a rewritable optical disk, a rewritable magnetic tape, or some combination of the above. The media used by persistent storage 2008 also can be removable. For example, a removable hard drive can be used for persistent storage 2008.

Communications unit 2010, in these illustrative examples, provides for communications with other data processing systems or devices. In these illustrative examples, communications unit 2010 is a network interface card.

Input/output unit 2012 allows for input and output of data with other devices that can be connected to data processing system 2000. For example, input/output unit 2012 can provide a connection for user input through at least one of a keyboard, a mouse, or some other suitable input device. Further, input/output unit 2012 can send output to a printer. Display 2014 provides a mechanism to display information to a user.

Instructions for at least one of the operating system, applications, or programs can be located in storage devices 2016, which are in communication with processor unit 2004 through communications framework 2002. The processes of the different embodiments can be performed by processor unit 2004 using computer-implemented instructions, which can be located in a memory, such as memory 2006.

These instructions are program instructions and are also referred to as program code, computer usable program code, or computer-readable program code that can be read and executed by a processor in processor unit 2004. The program code in the different embodiments can be embodied on different physical or computer-readable storage media, such as memory 2006 or persistent storage 2008.

Program code 2018 is located in a functional form on computer-readable media 2020 that is selectively removable and can be loaded onto or transferred to data processing system 2000 for execution by processor unit 2004. Program code 2018 and computer-readable media 2020 form computer program product 2022 in these illustrative examples. In the illustrative example, computer-readable media 2020 is computer-readable storage media 2024.

Computer-readable storage media 2024 is a physical or tangible storage device used to store program code 2018 rather than a media that propagates or transmits program code 2018. Computer-readable storage media 2020, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 2018 can be transferred to data processing system 2000 using a computer-readable signal media. The computer-readable signal media are signals and can be, for example, a propagated data signal containing program code 2018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 2020" can be singular or plural. For example, program code 2018 can be located in computer-readable media 2020 in the form of a single storage device or system. In another example, program code 2018 can be located in computer-readable media 2020 that is distributed in multiple data processing systems. In other words, some instructions in program code 2018 can be located in one data processing system while other instructions in program code 2018 can be located in another data processing system. For example, a portion of program code 2018 can be located in computer-readable media 2020 in a server computer while another portion of program code 2018 can be located in computer-readable media 2020 located in a set of client computers.

The different components illustrated for data processing system 2000 are not meant to provide architectural limitations to the manner in which different embodiments can be implemented. In some illustrative examples, one or more of the components may be incorporated in or otherwise form a portion of, another component. For example, memory 2006, or portions thereof, can be incorporated in processor unit 2004 in some illustrative examples. The different illustrative examples can be implemented in a data processing system including components in addition to or in place of those illustrated for data processing system 2000. Other components shown in FIG. 20 can be varied from the illustrative examples shown. The different embodiments can be implemented using any hardware device or system capable of running program code 2018.

Figure 21:
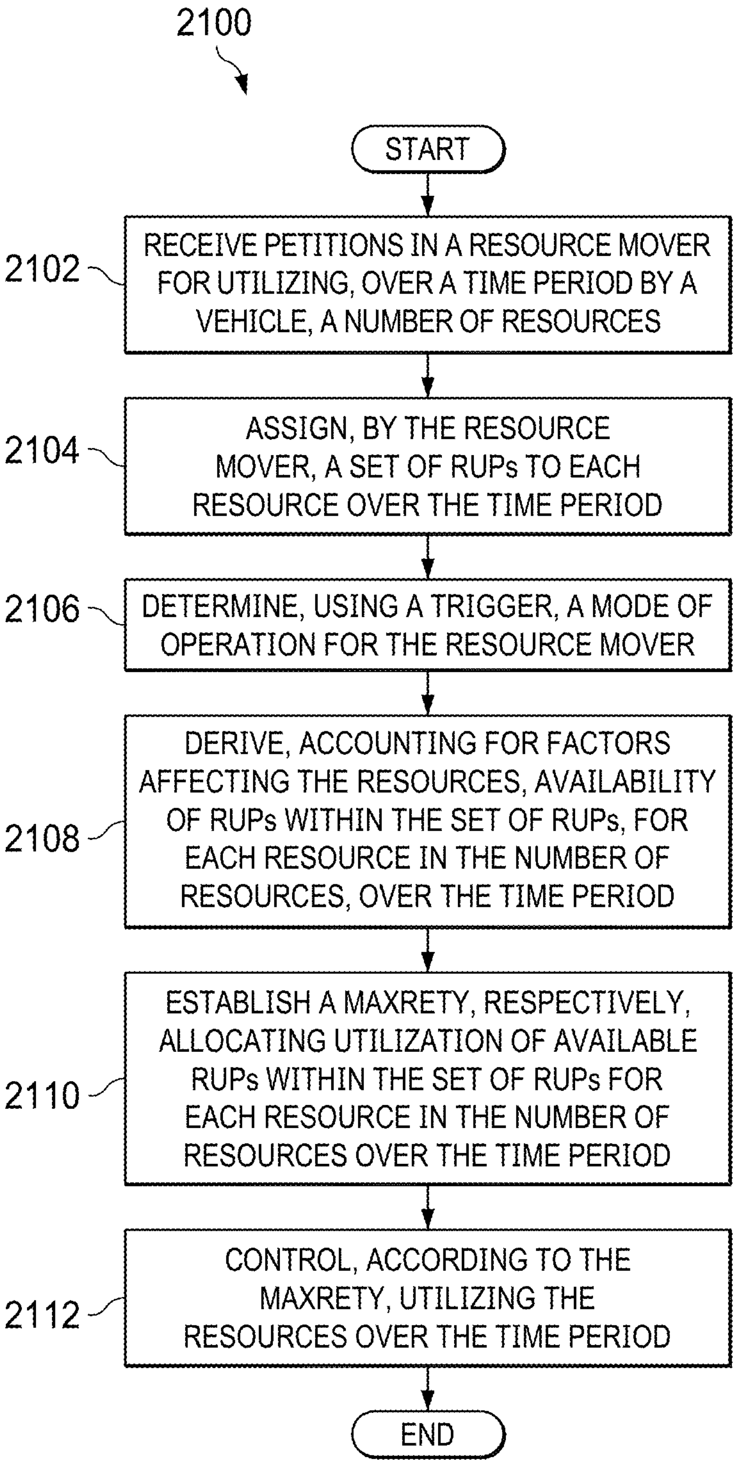
FIG. 21, is an illustration of a flowchart of process for moving resources is depicted in accordance with an illustrative example.

Turning next to FIG. 21, an illustration of a flowchart of process for moving resources is depicted in accordance with an illustrative example. The process for moving resources may be considered as incorporating all elements and features of all figures presented above. Flowchart 2100 for a process for moving resources may begin with receiving petitions in a resource mover for a utilization, over a time period, by a vehicle of a number of resources (Operation 2102) and may also include: assigning, by the resource mover, a set of RUPs to each resource over the time period (Operation 2104); determining, using a trigger, a mode of operation for the resource mover (Operation 2106); deriving, accounting for factors affecting the resources, availability of RUPs within the set of RUPs, for each resource in the number of resources, over the time period (Operation 2108); establishing a maxrety, respectively, allocating utilization of available RUPs within the set of RUPs for each resource in the number of resources over the time period (Operation 2110); and controlling, according to the maxrety, utilizing the resources over the time period (Operation 2112).

Applicable to the steps in FIG. 21, the following may also be applied. The mode of operation may be either a pre-execution mode or an execution mode. The trigger may be activated by an ultradynamic state of any source in a resource movement system or by a premonition. The factors affecting the resources may include a noise regulation, a passenger load, an operator qualification, a flight attendant availability, a gate agent availability, a ground servicing crew qualification, a taxi duration, a boarding duration, a deboarding time, a gate occupancy time, a number and/or location of LoLAS for departures, a number and/or location of LoLAs for arrivals, a potential conflict check time, a number of vehicles (282), or a number and location of non-gate parking spots (280).

Additionally applicable to the steps in FIG. 21, the following may also be applied. Each RUP in the set of RUPs may have a 30 second duration. The set of RUPs may include arrival RUPs, departure RUPs, and service RUPs. The process for moving resources may also include deriving, using a RUP for a LoLA and a RUP for a gate: the arrival RUPs, the departure RUPs, and the service RUPs. The process for moving resources may also include the resource mover responding to an unexpected event by reallocating at least one of: an arrival RUP, a departure RUP, or a service RUP. The process for moving resources may also include the resource mover reallocating at least one of: an arrival RUP, a departure RUP, or a service RUP, in execution mode.

Figure 22:
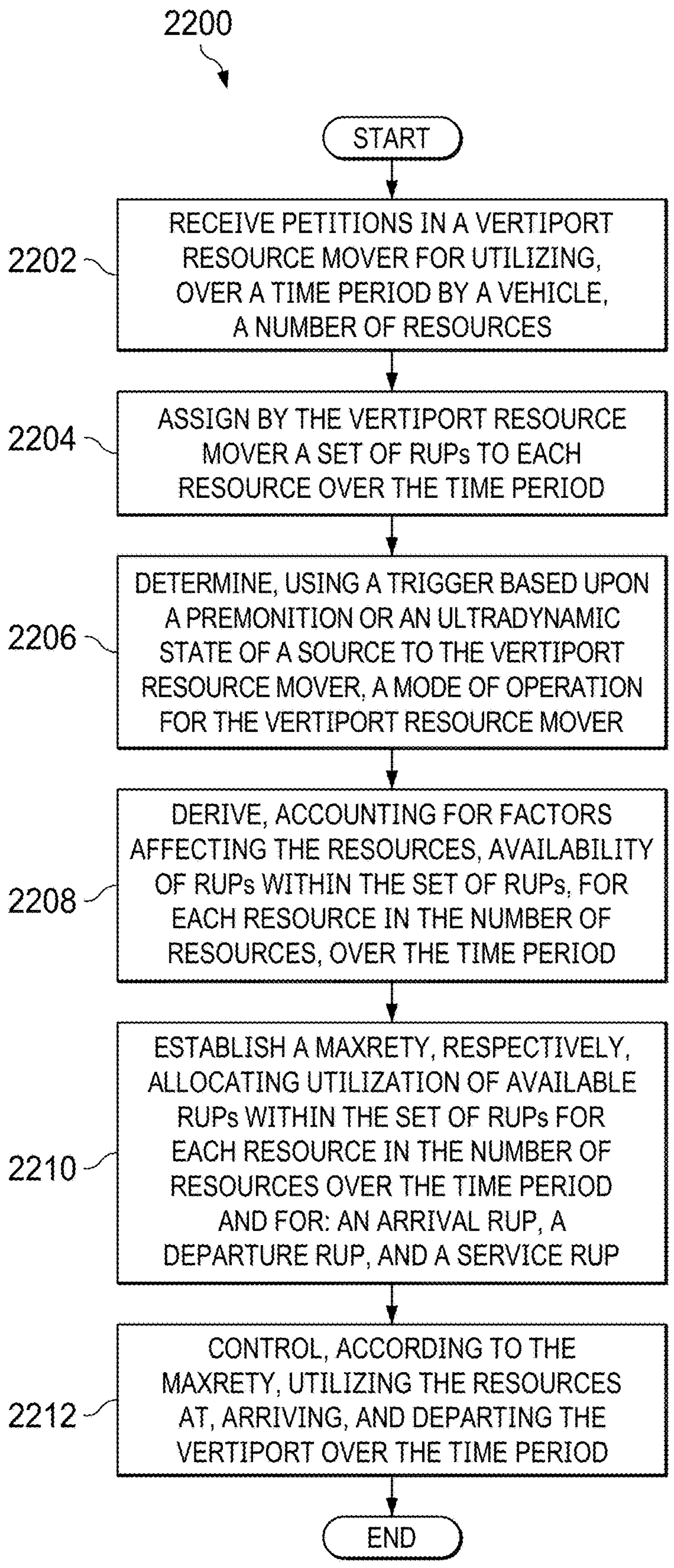
FIG. 22, is an illustration of a flowchart of process for moving resources at a vertiport is depicted in accordance with an illustrative example.

Turning next to FIG. 22, an illustration of a flowchart of process for moving resources at a vertiport is depicted in accordance with an illustrative example. The process for moving resources may be considered as incorporating all elements and features of all figures presented above. Flowchart 2200 for a process for moving resources at a vertiport may begin with receiving petitions in a vertiport resource mover for a utilization, over a time period, by a vehicle of a number of resources (Operation 2202) and may also include: assigning by the vertiport resource mover a set of RUPs to each resource over the time period (Operation 2204); determining, using a trigger based upon a premonition or an ultradynamic state of a source to the vertiport resource mover, a mode of operation for the vertiport resource mover (Operation 2206); deriving, accounting for factors affecting the resources, availability of RUPs within the set of RUPs, for each resource in the number of resources, over the time period (Operation 2208); establishing a maxrety, respectively, allocating utilization of available RUPs within the set of RUPs for each resource in the number of resources over the time period and for: and arrival RUP, a departure RUP, and a service RUP (Operation 2210); and controlling, according to the maxrety, utilizing the resources at, arriving, and departing the vertiport over the time period (Operation 2212).

Some features of the illustrative examples are described in the following clauses. These clauses are examples of features not intended to limit other illustrative examples.

Clause 1. A process for moving resources, the process comprising:

receiving petitions in a resource mover for utilizing, over a time period by a vehicle, a number of resources;

assigning, by the resource mover, a set of RUPs to each resource over the time period;

determining, using a trigger, a mode of operation for the resource mover;

deriving, accounting for factors affecting the resources, availability of RUPs within the set of RUPs, for each resource in the number of resources, over the time period;

establishing a maxrety, respectively, allocating utilization of available RUPs within the set of RUPs for each resource in the number of resources over the time period; and controlling, according to the maxrety, utilizing the resources over the time period.

Clause 2. The process of clause 1, wherein the mode of operation is either a pre-execution mode or an execution mode.

Clause 3. The process of clause 1, wherein the trigger is activated by an ultradynamic state of any source in a resource movement system.

Clause 4. The process of clause 1, wherein the trigger is activated by a premonition.

Clause 5. The process of clause 1, wherein the factors affecting the resources comprise a noise regulation.

Clause 6. The process of clause 1, wherein the factors affecting the resources comprise:

a passenger load, an operator qualification, a flight attendant availability, a gate agent availability, or a ground servicing crew qualification.

Clause 7. The process of clause 1, wherein the factors affecting the resources comprise:

a taxi duration, a boarding duration, a deboarding time, a gate occupancy time, a number and/or location of LoLAs for departures, a number and/or location of LoLAs for arrivals, a potential conflict check time, a number of vehicles, or a number and location of non-gate parking spots.

Clause 8. The process of clause 1, wherein each RUP in the set of RUPs may have a 30 second duration.

Clause 9. The process of clause 1, further comprising the resource mover forming arrival RUPs, departure RUPs, and service RUPs.

Clause 10. The process of clause 9, further comprising deriving, using a RUP for a LoLA and a RUP for a gate: the arrival RUPs, the departure RUPs, and the service RUPs.

Clause 11. The process of clause 1, further comprising the resource mover responding to an unexpected event by reallocating at least one of: an arrival RUP, a departure RUP, or a service RUP.

Clause 12. The process of clause 11, further comprising the resource mover reallocating at least one of: an arrival RUP, a departure RUP, or a service RUP, in execution mode.

Clause 13. A resource movement machine that comprises:

a computer system that comprises a resource mover configured to:

receive petitions for a utilization, over a time period, by a vehicle of a number of resources;

assign a set of RUPs to each resource over the time period; determine, based upon a trigger, a mode of operation for the resource mover;

derive, based upon factors that affect the resources, an availability of RUPs within the set of RUPs, for each resource in the number of resources, over the time period;

establish a maxrety, respectively, that allocates utilization of available RUPs within the set of RUPs for each resource in the number of resources over the time period; and control, based upon the maxrety, utilization of the resources over the time period.

Clause 14. The resource movement machine of clause 13, wherein the mode of operation is either a pre-execution mode or an execution mode.

Clause 15. The resource movement machine of claim 13, wherein the trigger is based upon an ultradynamic state of any source in a resource movement system.

Clause 16. The resource movement machine of clause 13, wherein the trigger is based upon a premonition.

Clause 17. The resource movement machine of clause 13, wherein the factors comprise a noise regulation.

Clause 18. The resource movement machine of clause 13, wherein the resource mover is further configured to form: arrival RUPs, departure RUPs, and service RUPs.

Clause 19. The resource movement machine of clause 18, wherein: the arrival RUPs, the departure RUPS, and the service RUPs, are based upon a RUP for a LoLA and a RUP for a gate.

Clause 20. A process for moving resources at a vertiport, the process comprising:

receiving petitions in a vertiport resource mover for utilizing, over a time period by a vehicle, a number of resources;

assigning by the vertiport resource mover a set of RUPs to each resource over the time period;

determining, using a trigger based upon a premonition or an ultradynamic state of a source to the vertiport resource mover, a mode of operation for the vertiport resource mover;

deriving, accounting for factors affecting the resources, availability of RUPs within the set of RUPs, for each resource in the number of resources, over the time period;

establishing a maxrety, respectively, allocating utilization of available RUPs within the set of RUPs for each resource in the number of resources over the time period and for: an arrival RUP, a departure RUP, and a service RUP; and controlling, according to the maxrety, utilizing the resources at, arriving, and departing the vertiport over the time period.

The invention claimed is:

1. A process for moving resources, the process comprising:

receiving petitions in a resource mover for utilizing, over a time period, by a vehicle, a number of resources;

assigning, by the resource mover, a set of Resource Utilization Periods to each resource over the time period;

determining, using a trigger, a mode of operation for the resource mover;

deriving, accounting for factors affecting the resources, availability of Resource Utilization Periods within the set of Resource Utilization Periods for each resource in the number of resources, over the time period;

establishing a maxrety, respectively, allocating utilization of available Resource Utilization Periods within the set of Resource Utilization Periods for each resource in the number of resources over the time period;

moving under automated control, according to the maxrety, the resources over the time period; and controlling, according to the maxrety, utilizing the resources over the time period, wherein the trigger is activated by an ultradynamic state of any source in a resource movement system.

2. The process of claim 1, wherein the mode of operation is either a pre-execution mode or an execution mode.

3. The process of claim 2, wherein each Resource Utilization Period in the set of Resource Utilization Periods has a 30 second duration.

4. The process of claim 1, wherein the trigger is activated by a premonition.

5. The process of claim 1, wherein the factors affecting the resources comprise a noise regulation.

6. The process of claim 1, wherein the factors affecting the resources comprise:

a passenger load, an operator qualification, a flight attendant availability, a gate agent availability, or a ground servicing crew qualification.

7. The process of claim 1, wherein the factors affecting the resources comprise:

a taxi duration, a boarding duration, a deboarding time, a gate occupancy time, a number and/or location of launch or Land Area for departures, a number and/or location of launch or Land Area for arrivals, a potential conflict check time, a number of vehicles, or a number and location of non-gate parking spots.

8. The process of claim 1, wherein each Resource Utilization Period in the set of Resource Utilization Periods has a 30 second duration.

9. The process of claim 1, further comprising the resource mover forming arrival Resource Utilization Periods, departure Resource Utilization Period, and service Resource Utilization Periods.

10. The process of claim 9, further comprising deriving, using a Resource Utilization Period for a launch or Land Area and a Resource Utilization Period for a gate: the arrival Resource Utilization Periods, the departure Resource Utilization Periods, and the service Resource Utilization Periods.

11. The process of claim 1, further comprising the resource mover responding to an unexpected event by reallocating at least one of: an arrival Resource Utilization Period, a departure Resource Utilization Period, or a service Resource Utilization Period.

12. The process of claim 11, further comprising the resource mover reallocating at least one of: an arrival Resource Utilization Period, a departure Resource Utilization Period, or a service Resource Utilization Period, in execution mode.

13. A resource movement machine that comprises:

a computer system that comprises a resource mover configured to:

receive petitions for a utilization, over a time period, by a vehicle of a number of resources;

assign a set of Resource Utilization Periods to each resource over the time period; determine, based upon a trigger, a mode of operation for the resource mover;

derive, based upon factors that affect the resources, an availability of Resource Utilization Periods within the set of Resource Utilization Period, for each resource in the number of resources, over the time period;

establish a maxrety, respectively, that allocates utilization of available Resource Utilization Periods within the set of Resource Utilization Periods for each resource in the number of resources over the time period; and move under automated control, according to the maxrety, the resources over the time period; and control, based upon the maxrety, utilization of the resources over the time period, wherein the trigger is based upon an ultradynamic state of any source in a resource movement system.

14. The resource movement machine of claim 13, wherein the mode of operation is either a pre-execution mode or an execution mode.

15. The resource movement machine of claim 14, each Resource Utilization Period in the set of Resource Utilization Periods has a 30 second duration.

16. The resource movement machine of claim 13, wherein the trigger is based upon a premonition.

17. The resource movement machine of claim 13, wherein the factors comprise a noise regulation.

18. The resource movement machine of claim 13, wherein the resource mover is further configured to form: arrival Resource Utilization Periods, departure Resource Utilization Periods, and service Resource Utilization Periods.

19. The resource movement machine of claim 18, wherein: the arrival Resource Utilization Periods, the departure Resource Utilization Periods and the service Resource Utilization Periods, are based upon a Resource Utilization Period for a launch or Land Area and a Resource Utilization Period for a gate.

20. A process for moving under automated control resources at a vertiport, the process comprising:

receiving petitions in a vertiport resource mover for utilizing, over a time period by a vehicle, a number of resources;

assigning by the vertiport resource mover a set of Resource Utilization Periods to each resource over the time period;

determining, using a trigger based upon an ultradynamic state of a source to the vertiport resource mover, a mode of operation for the vertiport resource mover;

deriving, accounting for factors affecting the resources, availability of Resource Utilization Periods within the set of Resource Utilization Periods, for each resource in the number of resources, over the time period;

establishing a maxrety, respectively, allocating utilization of available Resource Utilization Periods within the set of Resource Utilization Periods for each resource in the number of resources over the time period and for: an arrival Resource Utilization Period, a departure Resource Utilization Period, and a service Resource Utilization Period;

moving under automated control, according to the maxrety, the resources at the vertiport over the time period; and controlling, according to the maxrety, utilizing the resources at, arriving, and departing the vertiport over the time period, wherein the trigger is activated by an ultradynamic state of any source in a resource movement system.

* * * * *